US008373619B2

(12) United States Patent
Tsujimoto

(10) Patent No.: US 8,373,619 B2
(45) Date of Patent: Feb. 12, 2013

(54) IMAGE PROCESSING SYSTEM, IMAGE PROCESSING APPARATUS, ABERRATION CORRECTION METHOD, AND COMPUTER-READABLE STORAGE MEDIUM

(75) Inventor: Takuya Tsujimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 825 days.

(21) Appl. No.: 12/557,423

(22) Filed: Sep. 10, 2009

(65) Prior Publication Data

US 2010/0090929 A1    Apr. 15, 2010

(30) Foreign Application Priority Data

Oct. 9, 2008   (JP) .................................. 2008-263057

(51) Int. Cl.
*G09G 5/00*        (2006.01)
*G06K 9/32*        (2006.01)
(52) U.S. Cl. ................... 345/8; 345/7; 382/300
(58) Field of Classification Search ................. None
See application file for complete search history.

(56) References Cited

U.S. PATENT DOCUMENTS

| | | | | |
|---|---|---|---|---|
| 4,578,812 | A * | 3/1986 | Yui .............................. | 382/300 |
| 6,538,691 | B1 * | 3/2003 | Macy et al. ................ | 348/222.1 |
| 7,245,319 | B1 | 7/2007 | Enomoto | |
| 2007/0025636 | A1 * | 2/2007 | Furukawa et al. ........... | 382/275 |

FOREIGN PATENT DOCUMENTS

| | | |
|---|---|---|
| JP | 8-205181 A | 8/1996 |
| JP | 11-250239 A | 9/1999 |
| JP | 2000-69343 A | 3/2000 |
| JP | 2004-153323 A | 5/2004 |

OTHER PUBLICATIONS

Japanese Office Action dated Jul. 20, 2012 issued in corresponding Japanese Patent Application No. 2008-263057.
"Correcting Distortion Caused in a Book on Page Turning Machine", Imaging & Visual Computing, The Journal of the Institute of Image Electronics Engineers of Japan 31 (5), Institute of Image Electronics Engineers, 2002, Japan, pp. 800-805 (with English Abstract).

* cited by examiner

*Primary Examiner* — Joseph Haley
*Assistant Examiner* — Nicholas Lee
(74) *Attorney, Agent, or Firm* — Fitzpatrick, Cella, Harper & Scinto

(57) ABSTRACT

An image processing system, which corrects an aberration generated in an optical system by executing coordinate conversion of pixels of an image, has a table which holds correspondence between the positions of pixels before and after the coordinate conversion, acquires coordinates after conversion corresponding to the coordinates of representative points to be converted from the table, and calculates coordinates after conversion of a pixel between the acquired representative points by an interpolation calculation using a Lagrange interpolation formula.

16 Claims, 20 Drawing Sheets

F I G. 16
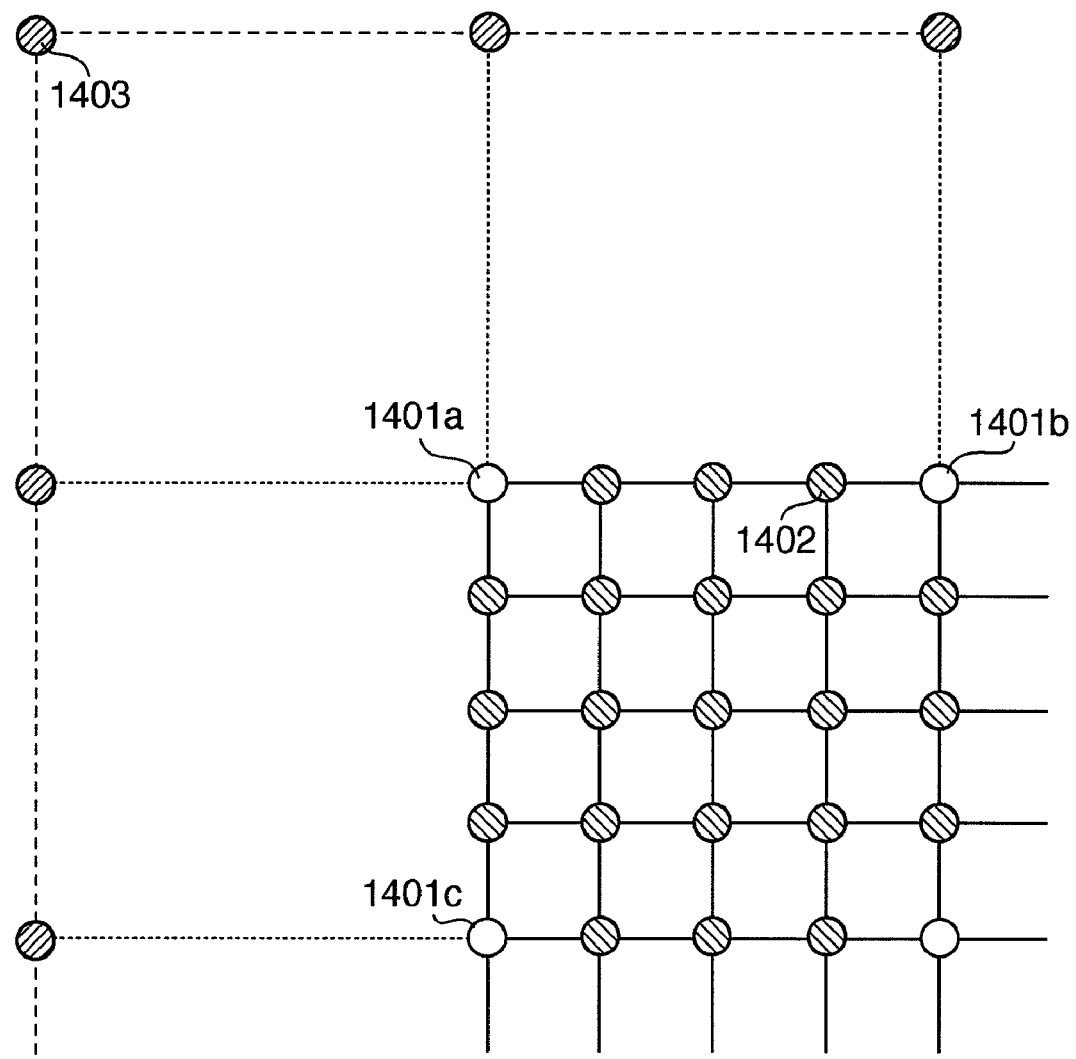

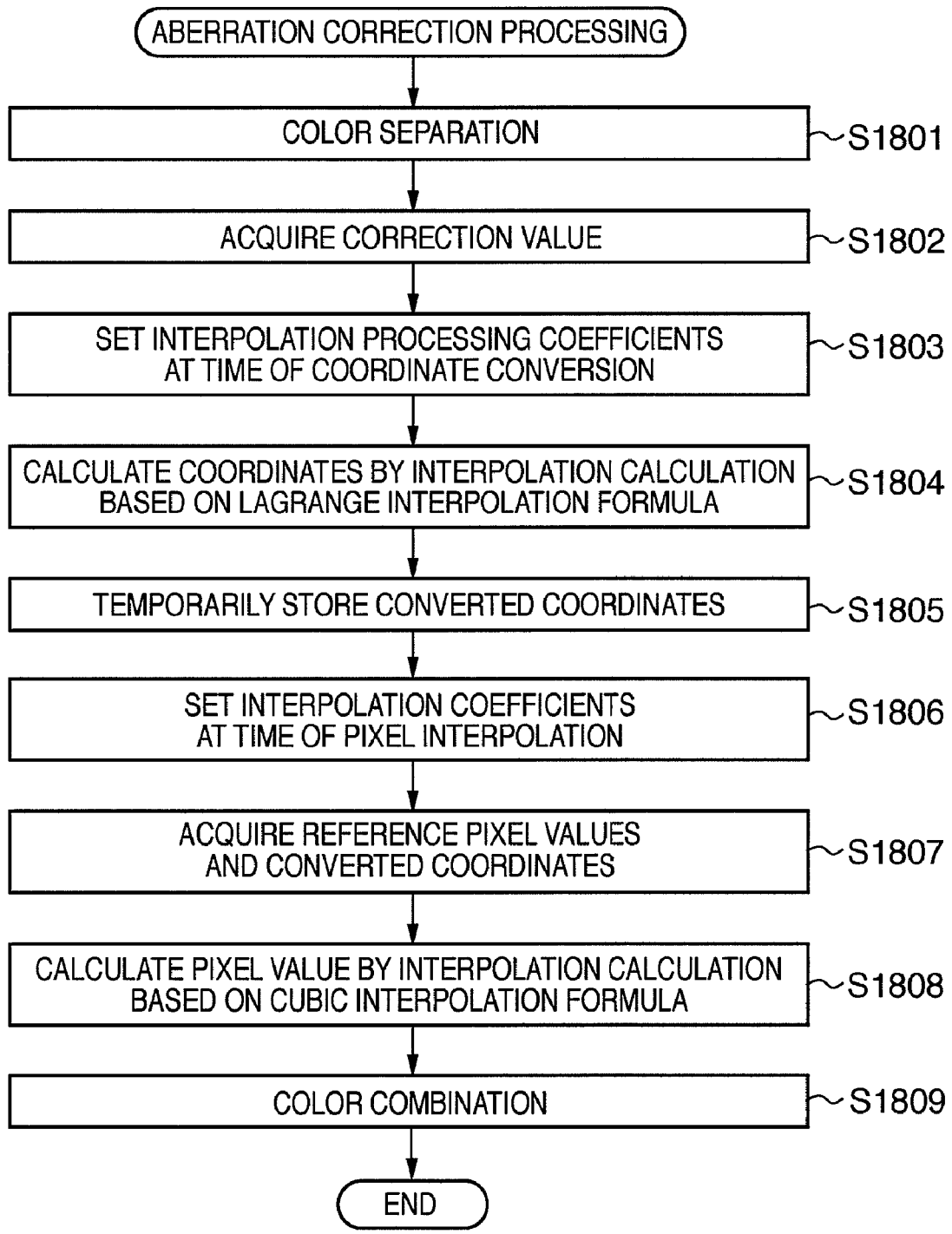

IMAGE PROCESSING SYSTEM, IMAGE PROCESSING APPARATUS, ABERRATION CORRECTION METHOD, AND COMPUTER-READABLE STORAGE MEDIUM

BACKGROUND OF THE INVENTION

1. Field of the Invention

The present invention relates to an image processing system, image processing apparatus, aberration correction method, and computer-readable storage medium, which correct aberrations of an optical system.

2. Description of the Related Art

In recent years, as a technique for seamlessly blending physical and virtual worlds in real time, a so-called MR (Mixed Reality) technique is known. As one MR technique, a technique using a video see-through HMD (Head Mounted Display; to be hereinafter abbreviated as an HMD) is known. With this technique, an object which nearly matches an object observed from the pupil position of an HMD user is captured using, for example, a video camera, and CG (Computer Graphics) is superimposed on that captured image. Then, the HMD user can observe an MR image.

The video see-through HMD acquires digital image data of an object by capturing an image of that object using a charge coupled device such as a CCD, and displays an MR image (mixed reality image) superimposed with a CG image for the user via a display device such as a liquid crystal display.

Size and weight reductions of the HMD to be mounted on the head are in demand. As for image capture and display optical systems, a method of applying digital correction to various aberrations by signal processing is selected rather than a method of correcting them by optical approaches that generally lead to increases in size and weight, and approaches that adopt inexpensive lenses or reduce the number of lenses are adopted.

When an optical system is configured using inexpensive lenses or by suppressing the number of lenses, high image quality of an image to be displayed cannot often be maintained due to lens aberration. That is, barrel- or pin-cushion-shaped images are often obtained due to distortion aberrations of lenses. Also, red, blue, and green color bleeding appears at the boundaries of object images due to chromatic aberrations of magnification of lenses. For this reason, a technique is required to correct image quality drop of an object image due to such aberrations of lenses.

Techniques which correct distortion aberrations and chromatic aberrations of magnification of various aberrations of the optical systems by signal processing are disclosed. Such techniques are roughly classified into the following three techniques based on their principal methods, and an overview of each will be provided.

The first technique is correction processing of distortion aberrations and chromatic aberrations of magnification by means of address conversion. Address conversion is a method of moving a distorted image to an ideal image position based on the correspondence between an image forming position obtained by an ideal optical system and an actual image forming position which suffers the influence of aberrations in the optical system of an image capture system. Various techniques from that which stores the correspondence associated with converted positions as a table, and simply converts the correspondence (addresses) between the read and write addresses of a memory to that which holds high-precision coordinate data after conversion are available. In a display system as well, a display position is converted based on the correspondence between a pixel to be displayed and an actual display position. When such pixel conversion is done, distortion aberrations as distortions of an image can be corrected. When conversion is done for respective colors which define each pixel, chromatic aberrations of magnification as color misregistration can be corrected.

The second technique is correction processing of chromatic aberrations of magnification by means of resolution conversion. Using different variable magnifications depending on colors, enlargement or reduction processing is applied to a reference color, thus obtaining an image which suffers less color bleeding.

The third technique is correction processing of distortion aberrations using a polynomial and of chromatic aberrations of magnification by means of distortion aberration correction of respective colors. An approximation is made using a polynomial of higher degree including correction parameters as coefficients so as to calculate coordinates after conversion.

The aforementioned address conversion is known as a technique which has relatively high versatility, and can improve the coordinate conversion precision. However, the size of a reference table which stores the correspondence with the coordinates after conversion depends on the size of an original image and the conversion precision, and the table size also becomes extreme in recent high-resolution and high-image quality trends. For this reason, the following arrangement is generally adopted. That is, in general, the reference table stores representative points after decimation in place of information of all corresponding conversion points, and coordinate values between representative points are calculated by interpolation processing between representative points.

In case of chromatic aberration correction that corrects color misregistration, an arrangement which selects one of a plurality of colors as a reference color, and stores differences from the reference color for other colors, and an arrangement which reduces the table size using the symmetry of an optical system are known (Japanese Patent Laid-Open No. 8-205181).

If right and left parts or upper and lower parts are symmetric with respect to an image, reference values of the symmetric part can be generated from one direction side, and the table size can be halved. Furthermore, when both upper and lower and right and left parts are symmetric (in case of a rotation symmetry system), the table size can be reduced to ¼ of its original size.

Linear interpolation is popularly used as interpolation processing between representative points. If the interval between neighboring representative points is set not to be so broad, errors generated at the time of interpolation can be reduced. In general, interpolation errors can be reduced by adopting an interpolation formula of a higher degree when the interval between representative points remains the same. In display image sizes from SVGA to SXGA classes which are normally adopted in a conventional HMD, if an interval ranges from about 8 pixels to 16 pixels, an interpolation calculation which is satisfactory in terms of appearance can be made independently of interpolation algorithms to be adopted. If decimation is made to have an interval more than 16 pixels, errors at the time of interpolation increase. An arrangement which implements aberration correction with higher precision using Bicubic as bicubic interpolation as interpolation processing at the time of coordinate conversion is also known (Japanese Patent Laid-Open No. 2004-153323).

However, the aforementioned related techniques suffer the following problems.

As described above, in order to realize a required precision by the address conversion, representative points have to be set at a given interval. As described above, at the SXGA resolution (image size), the conversion precision often drops when linear interpolation is used as an interpolation algorithm and the interval is set to be more than 16 pixels. In order to assure higher precision, the aforementioned polynomial of a higher degree may be used. In this case, a degree 10 or more may often be required, and an HMD that is to operate in real time requires many multipliers in calculations, thus exponentially increasing the circuit scale.

Not only an HMD but also an increased resolution is required in an image capture system device and display system device. In the future, the reference table size will tend to increase, as well as the access frequency to a memory used to configure the table. For this reason, it is expected to become increasingly difficult to reduce the table size while maintaining or improving the conversion precision.

In consideration of a balance between the two requirements, that is, the circuit scale and conversion precision, a method that adopts Bicubic as a cubic formula may be used, as described in Japanese Patent Laid-Open No. 2004-153323. However, in this case, if optical lenses or prisms have uniform media and refractive indices, image forming position deviations due to aberrations tend to change very smoothly irrespective of their shapes, the number of times of image formation, and the number of lenses. As is known, Bicubic can implement high-image quality processing in an image interpolation calculation. This is because Bicubic requires a larger number of reference points than linear interpolation (bilinear) and has an effect of enhancing the sharpness of an image.

In interpolation processing at the time of coordinate conversion, it is confirmed that coordinate conversion errors increase compared to linear interpolation since an interpolation curve which produces that arbitrary sharpening effect is adopted. This means that the bicubic interpolation is not suited to interpolating image forming position deviations, which change smoothly.

As can be seen from the above description, an interpolation processing method is required that can broaden a representative point interval, that is, that requires only a practical circuit arrangement and table size (memory size) while ideally reducing conversion errors to be as small as those of a polynomial of higher degree.

SUMMARY OF THE INVENTION

The present invention provides a technique which can reduce coordinate conversion errors even when the size of a table used in coordinate conversion of pixels is reduced upon correction of image forming position deviations caused by aberrations.

According to a first aspect of the present invention, there is provided an image processing system, which corrects an aberration generated in an optical system by executing coordinate conversion of pixels of an image, comprising: a table configured to hold correspondence between positions of pixels before and after the coordinate conversion; an acquisition unit configured to acquire coordinates after conversion corresponding to coordinates of representative points to be converted from the table; and a coordinate calculation unit configured to calculate coordinates after conversion of a pixel between the representative points acquired by the acquisition unit by an interpolation calculation using a Lagrange interpolation formula.

According to a second aspect of the present invention, there is provided an image processing apparatus, which corrects an aberration generated in an optical system by executing coordinate conversion of pixels of an image, comprising: an acquisition unit configured to acquire coordinates after conversion corresponding to coordinates of representative points to be converted from a table which holds correspondence between positions of pixels before and after the coordinate conversion; and a coordinate calculation unit configured to calculate coordinates after conversion of a pixel between the representative points acquired by the acquisition unit by an interpolation calculation using a Lagrange interpolation formula.

According to a third aspect of the present invention, there is provided an aberration correction method, which corrects an aberration generated in an optical system by executing coordinate conversion of pixels of an image, comprising: acquiring coordinates after conversion corresponding to coordinates of representative points to be converted from a table which holds correspondence between positions of pixels before and after the coordinate conversion; and calculating coordinates after conversion of a pixel between the representative points acquired in the acquiring by an interpolation calculation using a Lagrange interpolation formula.

According to a fourth aspect of the present invention, there is provided a computer-readable storage medium storing a computer program for controlling a computer, which is incorporated in an image processing apparatus, which corrects an aberration generated in an optical system by executing coordinate conversion of pixels of an image, to function as: an acquisition unit configured to acquire coordinates after conversion corresponding to coordinates of representative points to be converted from a table which holds correspondence between positions of pixels before and after the coordinate conversion; and a coordinate calculation unit configured to calculate coordinates after conversion of a pixel between the representative points acquired by the acquisition unit by an interpolation calculation using a Lagrange interpolation formula.

Further features of the present invention will become apparent from the following description of exemplary embodiments with reference to the attached drawings.

BRIEF DESCRIPTION OF THE DRAWINGS

FIG. 16 is a view showing the concept of use of outer circumferential data;

FIG. 20 is a flowchart showing an example of the sequence of processing executed when the aberration correction LSI 408 according to the second embodiment corrects aberrations.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Note that this embodiment will exemplify an MR system to which an image processing system according to the present invention is applied.

First Embodiment

Figure 1:
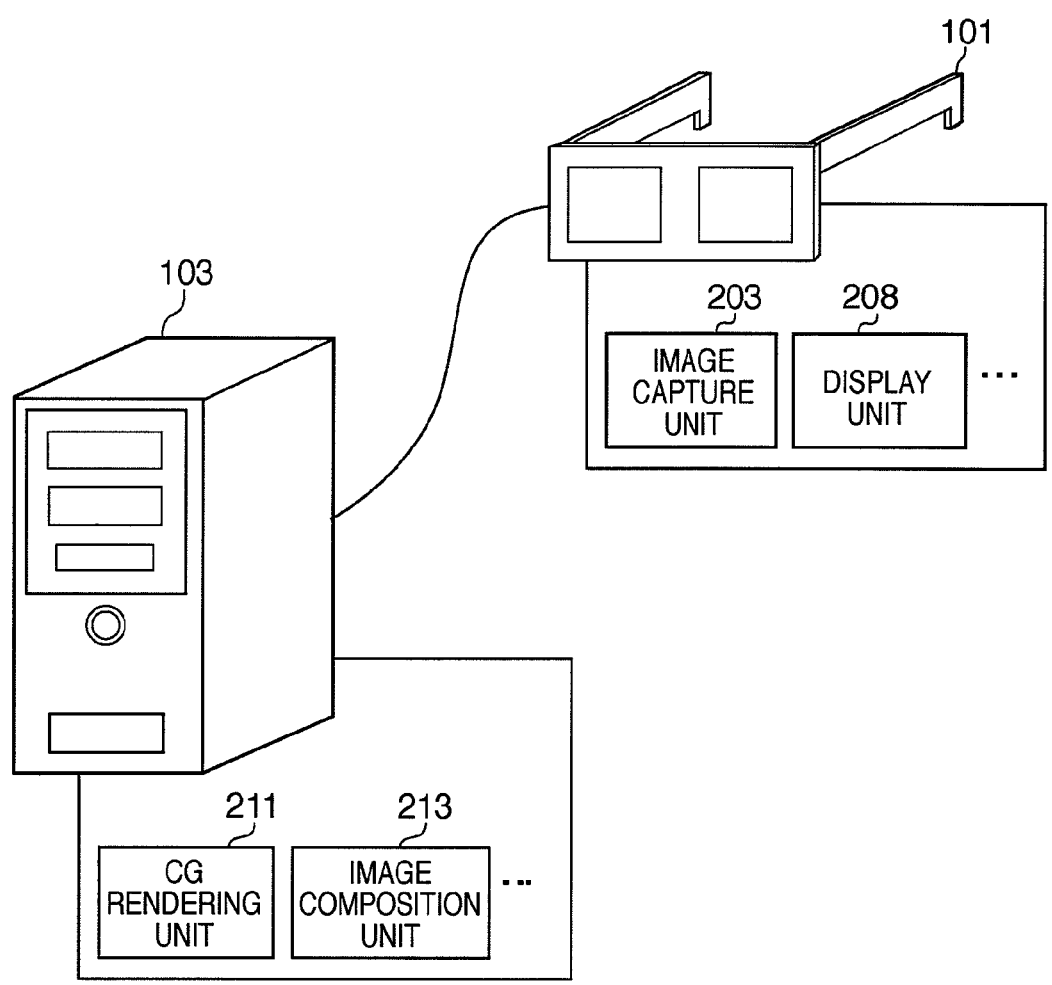
FIG. 1 is a view showing an example of the overall arrangement of an MR system to which an image processing system according to the present invention is applied.

FIG. 1 is a view showing an example of the overall arrangement of an MR system.

Mixed reality, that is, a so-called MR technique, is known as a technique for seamlessly blending physical and virtual worlds in real time. The MR technique uses a display apparatus with an image capture function (to be referred to as an HMD hereinafter).

The HMD superimposes a CG image, which is generated based on three-dimensional position and orientation information including the position and direction of the user, on a background image of a physical space at the viewpoint of the user, which is acquired by its image capture unit 203, and displays a composite image on a display unit 208. As a result, the HMD user can experience mixed reality as if an object rendered by CG were existing on the physical space observed by the user. Note that FIG. 1 shows a head mounted type HMD, but the present invention is not limited to this. For example, a hand-held type display apparatus such as binoculars may be used.

The MR system includes an HMD 101 and image processing apparatus 103. The HMD 101 includes the image capture unit 203 and display unit 208. The image capture unit 203 captures an image of the physical space observed by the user. The display unit 208 displays to the HMD user the captured physical space image, an output image from the image processing apparatus 103, or a composite image obtained by superimposing a CG image generated by the image processing apparatus 103 on the physical space image. The HMD 101 has a function of communicating with the image processing apparatus 103, and a function of executing various types of image processing including resolution conversion and color space conversion of an image and distortion correction of an optical system, and transmission format conversion. Note that the HMD 101 may be driven by receiving a power supply from an external apparatus (for example, the image processing apparatus 103) or from a battery mounted in the apparatus itself.

The image processing apparatus 103 includes a CG rendering unit 211 which renders a CG image, and an image composition unit 213 which composites the physical space image and CG image. The image processing apparatus 103 communicates with the HMD 101. With this communication, the HMD 101 receives a composite image, and displays that composite image using the display unit 208.

Figure 2:
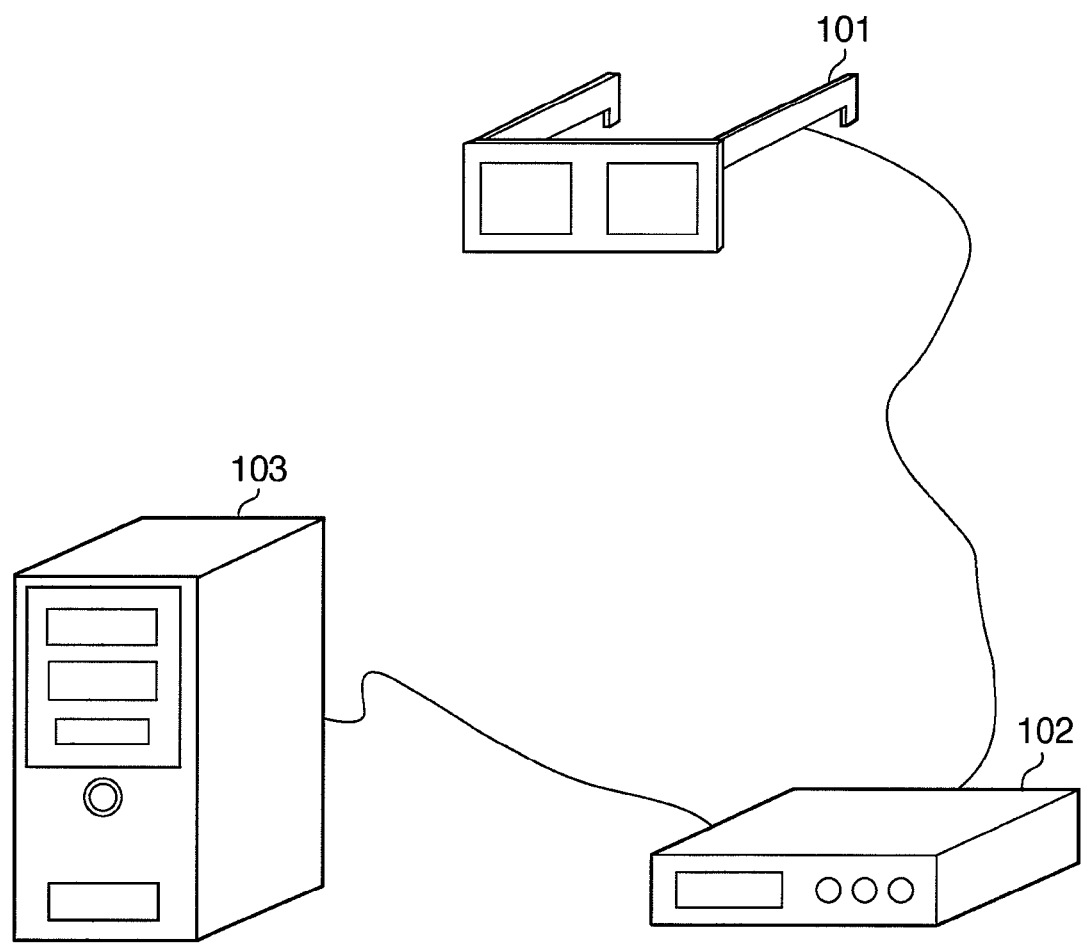
FIG. 2 is a view showing a modification of the overall arrangement of the MR system shown in FIG. 1.

The example of the overall arrangement of the MR system according to this embodiment has been described. Note that the arrangement shown in FIG. 1 is merely an example, and the present invention is not limited to this. For example, the HMD 101 executes various image processing including resolution conversion, color space conversion, and distortion correction of an optical system, and transmission format conversion. Alternatively, as shown in FIG. 2, some or all of these functions may be implemented by an independent apparatus (controller 102). In this case, the HMD 101 and image processing apparatus 103 exchange data via this controller 102. Of course, some or all of the functions implemented by the controller 102 may be implemented by the image processing apparatus 103. That is, the functions implemented by these apparatuses need not always be implemented, as shown in FIGS. 1 and 2, and some or all of these functions may be implemented by arbitrary apparatuses in the system. In FIG. 1, the respective apparatuses are connected via a cable, but some or all of these apparatuses may be connected wirelessly.

Figure 3:
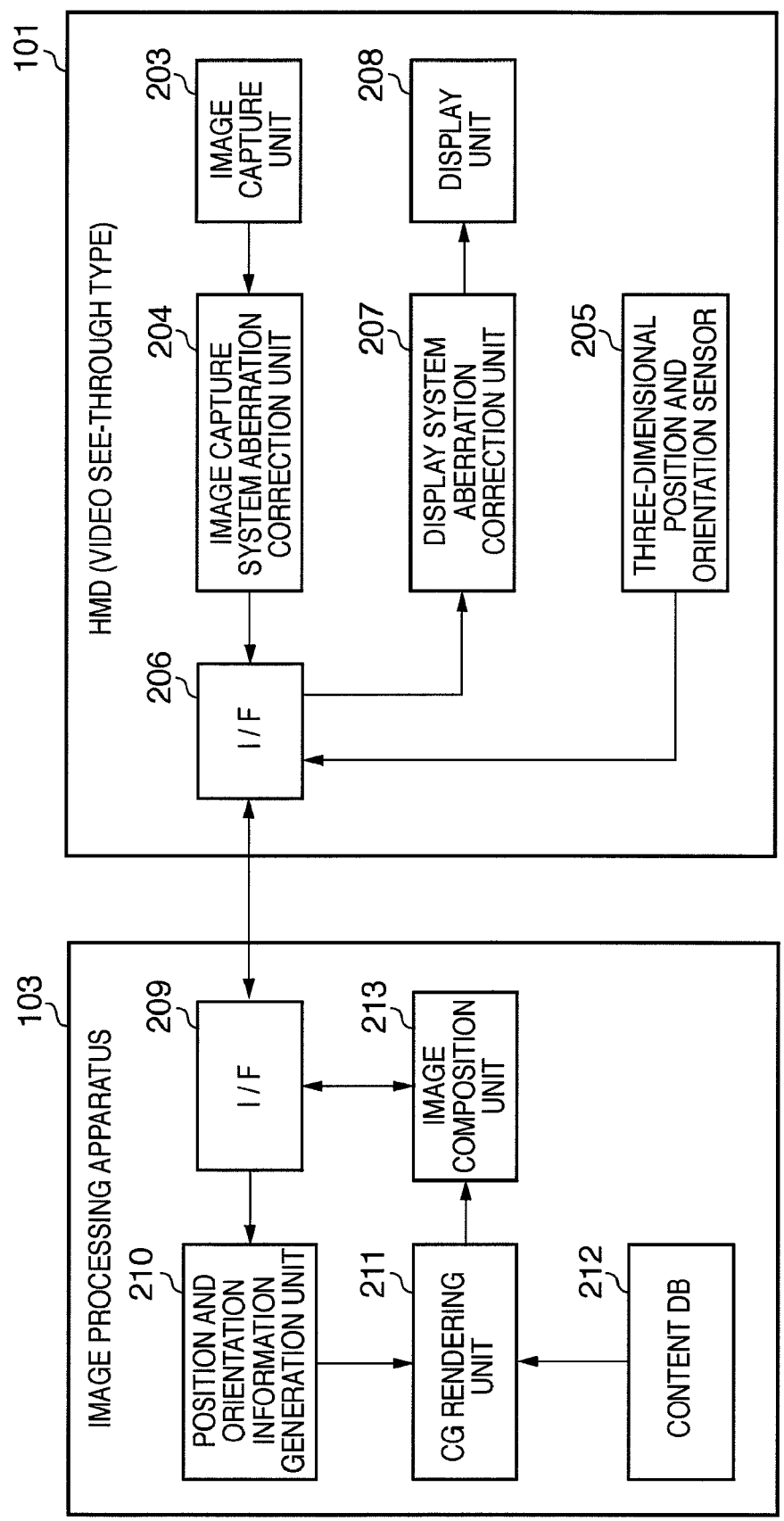
FIG. 3 is a block diagram showing an example of the functional arrangement in an HMD 101 and image processing apparatus 103 shown in FIG. 1.

FIG. 3 is a block diagram showing an example of the functional arrangement in the HMD 101 and image processing apparatus 103 shown in FIG. 1.

The HMD (video see-through type) 101 includes the image capture unit 203, the display unit 208, an I/F 206, a three-dimensional position and orientation sensor 205, an image capture system aberration correction unit 204, and a display system aberration correction unit 207.

The image capture unit 203 captures an image of an external world which nearly matches the line of sight position of the HMD user. The image capture unit 203 includes, for example, two sets of image capture elements, optical systems (to be referred to as image capture optical systems hereinafter), and signal processing circuits required to execute image processing to be described later, which are arranged for the right and left eyes and used to generate a stereoscopic image. That is, image capture by the image capture unit 203 is executed by forming a captured image on the image capture elements via the image capture optical systems.

The image capture system aberration correction unit 204 corrects aberrations generated in the image capture optical systems. Aberrations are generated when light arriving via an optical system deviates from an ideal image forming position, and results in, for example, an image quality drop of a captured image. Details of processing for correcting aberrations will be described later.

The three-dimensional position and orientation sensor 205 is a sensor which obtains position and orientation information of the HMD user. As the sensor, for example, a magnetic sensor and gyro sensor (acceleration, angular velocity) are used. The three-dimensional position and orientation sensor 205 outputs sensor data to the image processing apparatus 103 (more specifically, a position and orientation information generation unit 210). When position and orientation information is acquired based only on a captured image, the three-dimensional position and orientation sensor 205 may be omitted.

The I/F 206 transfers an image captured by the image capture unit 203 to the image processing apparatus 103, and transfers a composite MR image from the image processing apparatus 103 to the HMD 101. The I/F 206 serves as an interface when performing data communications between the HMD 101 and image processing apparatus 103. This I/F 206 has the same functions as those of an I/F 209 arranged on the image processing apparatus 103 side. Note that both the I/Fs 206 and 209 are required to operate in real time, and desirably adopt a communication standard allowing large-capacity transmission. As a wired system, USB (Universal Serial Bus) or IEEE 1394, or optical Gigabit Ethernet® or the like may be used. As a wireless system, a fast wireless communication compliant with the wireless LAN standard of IEEE 802.11, wireless PAN standard of IEEE802.15, or the like may be used. In this embodiment, an optical fiber for a wired system or UWB (Ultra Wide Band) for a wireless system is assumed. The transmission bandwidth of optical fiber is several Gbps, and that of UWB is several hundred Mbps.

The display unit 208 displays a composite MR image. The display unit 208 includes, for example, two sets of display devices and optical systems (to be referred to as display optical systems hereinafter) for the right and left eyes. The display unit 208 displays an image by forming a display image at the pupil positions of the HMD user via the display optical systems (by enlarging that image). As the display devices, for example, compact liquid crystal displays or retinal scanning devices based on an MEMS (Micro Electro Mechanical System) are used. The arrangement of the optical systems will be described later.

The display system aberration correction unit 207 corrects aberrations generated in the display optical systems. The processing of the display system aberration correction unit 207 are the same as those of the image capture system aberration correction unit 204. The HMD 101 has been described.

The image processing apparatus 103 has an advanced arithmetic processing function and graphic display function of a personal computer or workstation. For example, the image processing apparatus 103 generates position and orientation information from a captured image received from the HMD 101, generates a CG image based on the generated position and orientation information, and composites the CG image and captured image.

Note that the image processing apparatus 103 includes the I/F 209, a position and orientation information generation unit 210, the CG rendering unit 211, a content DB (Database) 212, and the image composition unit 213.

The I/F 209 serves as an interface upon making data communications between the image processing apparatus 103 and HMD 101. Note that the I/F 209 is functionally equivalent to the I/F 206 in the HMD 101.

The position and orientation information generation unit 210 generates position and orientation information of the HMD user. For example, the position and orientation information generation unit 210 generates position and orientation information by extracting markers or feature points that can be used as alternatives to the markers from a captured image received from the HMD 101. The precision can be improved by supplementarily using a captured image from an objective viewpoint (not shown) and information obtained by the three-dimensional position and orientation sensor 205 attached to the HMD 101; position and orientation information can be generated even when the captured image does not include any markers or feature points to be used.

The content DB 212 stores virtual images, and holds data associated with the virtual objects which form the virtual space. The data associated with the virtual objects includes, for example, layout positions and orientations of the virtual objects, and data indicating their operation rules. When each virtual object is defined by polygons, the data includes normal vector data and color data of respective polygons, and coordinate position data of vertices that define each polygon. If texture mapping is applied to each virtual object, the data includes texture data.

The CG rendering unit 211 renders a virtual space on which respective virtual objects are laid out using the data associated with these virtual objects stored in the content DB 212. The CG rendering unit 211 generates a virtual image (to be also referred to as a CG image hereinafter) that can be seen from the viewpoint of the observer on the rendered virtual space. Note that those who are skilled in the art know a technique for generating a virtual space image that can be seen from a viewpoint having a predetermined position and orientation, and a detailed description thereof will not be given.

The image composition unit 213 composites a captured image rendered as a background image and a CG image. An MR image composited by the image composition unit 213 is sent to the HMD 101 side via the I/F 209, and is displayed by the HMD 101.

In order to aid the understanding of the description of the MR system according to this embodiment, the sequence of processing upon displaying an MR image to the HMD user will be briefly explained.

The HMD 101 captures an image of an external world which nearly matches the line of sight position of the HMD user using the image capture unit 203. The image capture system aberration correction unit 204 corrects aberrations of the image capture optical systems from the captured image, and the corrected captured image is sent to the image processing apparatus 103 via the I/F 206.

In the image processing apparatus 103, the position and orientation information generation unit 210 calculates position and orientation information of the HMD 101 based on identification markers or other feature amounts in the captured image. After that, in the image processing apparatus 103, the CG rendering unit 211 generates a CG image based on the aforementioned position and orientation information, and the image composition unit 213 generates an MR image as a composite image by superimposing the CG image and captured image. This MR image is sent from the image processing apparatus 103 to the HMD 101 via the I/F 209. In the HMD 101, the display system aberration correction unit 207 corrects aberrations of the display optical systems as in the image capture systems, and the display unit 208 displays the corrected image.

With the above arrangement and processes, since aberration-corrected captured images and display images can be obtained, preferred images can be guided to the eyes of the user.

Figure 4:
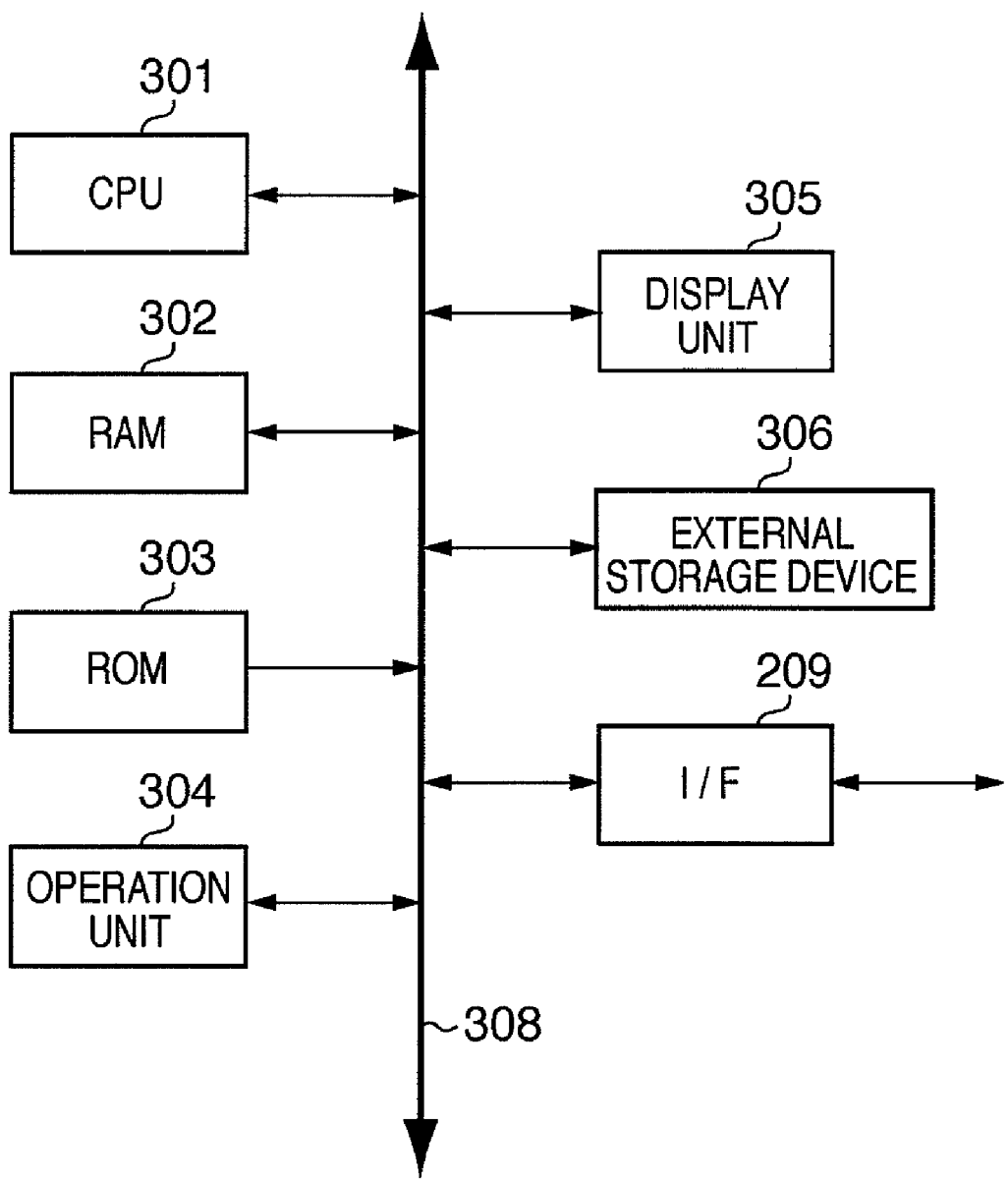
FIG. 4 is a block diagram showing an example of the hardware arrangement of a computer incorporated in the image processing apparatus 103 shown in FIG. 1.

FIG. 4 is a block diagram showing an example of the hardware arrangement of a computer incorporated in the image processing apparatus 103 shown in FIG. 1. Note that the same reference numerals in FIG. 4 denote the same components included in the functional arrangement used to describe FIG. 3, and a description thereof will not be repeated.

The computer includes, as its hardware arrangement, a CPU 301, a RAM 302, a ROM 303, an operation unit 304, a display unit 305, an external storage device 306, and the I/F 209.

The CPU 301 controls the overall computer using programs and data stored in the RAM 302 and ROM 303. That is, the CPU 301 systematically controls the processing in the image processing apparatus 103.

The RAM 302 temporarily stores programs and data loaded from the external storage device 306, data received from an external apparatus (for example, the HMD 101) via the I/F 209, and the like. The RAM 302 is used as a work area when the CPU 301 executes various kinds of processing. The ROM 303 stores setting data, a boot program (BIOS), and the like.

The operation unit 304 includes, for example, a keyboard and mouse, and inputs input operations from an operator to the apparatus. Then, the operator can input various instructions to the CPU 301.

The display unit 305 includes, for example, a CRT (Cathode Ray Tube) or liquid crystal panel, and displays various screens. That is, the display unit 305 presents, to the operator, processing results of the CPU 301 and a graphics board (not shown) by means of images and characters.

The external storage device 306 is a large-capacity information storage device represented by a hard disk drive. The external storage device 306 stores an OS (Operating System), and programs and data to be executed by the CPU 301. These programs and data are loaded into the RAM 302 as needed under the control of the CPU 301. A bus 308 interconnects the respective units of the computer.

Figure 5:
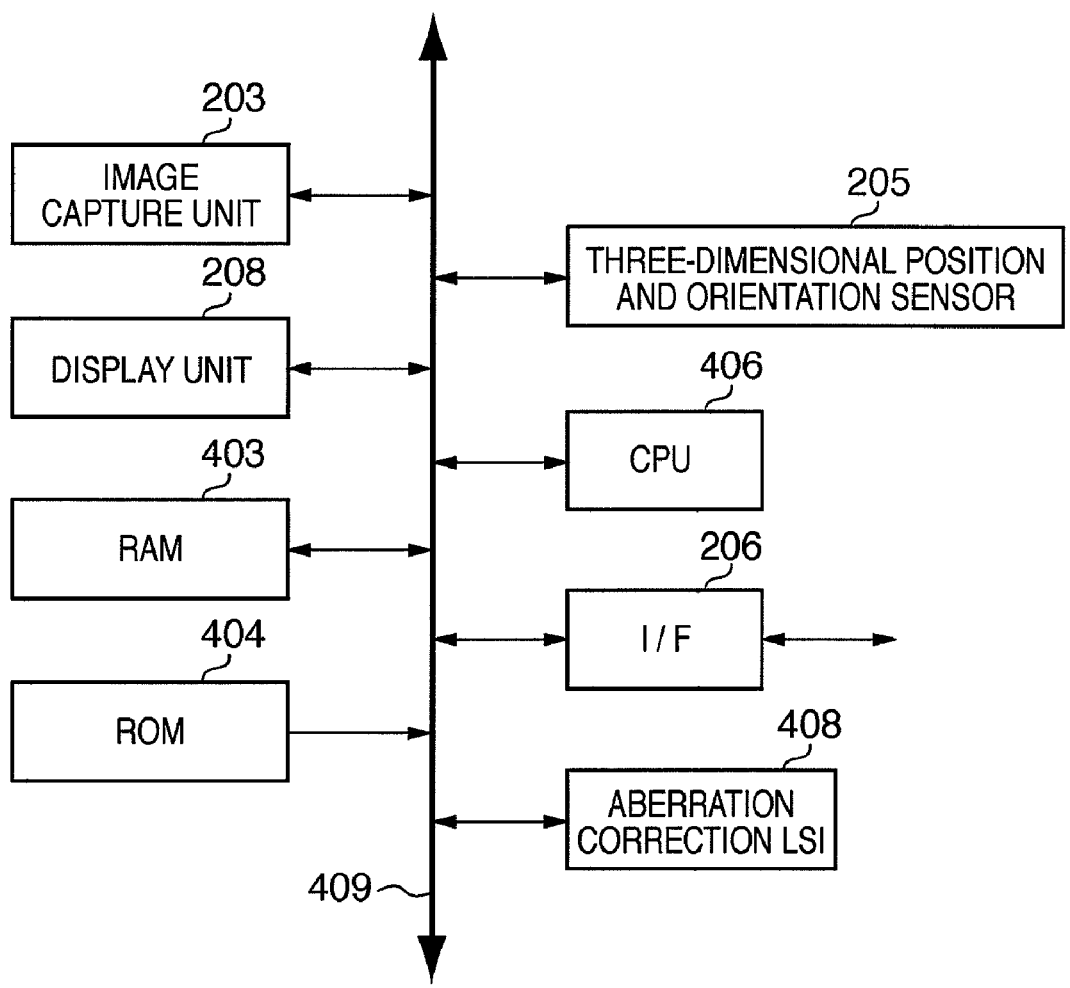
FIG. 5 is a block diagram showing an example of the hardware arrangement of the HMD 101 shown in FIG. 1.

FIG. 5 is a block diagram showing an example of the hardware arrangement of the HMD 101 shown in FIG. 1. Note that the same reference numerals in FIG. 5 denote the same components included in the functional arrangement used to describe FIG. 3, and a description thereof will not be repeated.

The HMD 101 includes, as its hardware arrangement, the image capture unit 203, the display unit 208, a RAM 403, a ROM 404, the three-dimensional position and orientation sensor 205, a CPU 406, the I/F 206, and an aberration correction LSI 408.

The CPU 406 controls the overall HMD 101 by executing programs for controlling various devices as well as initial settings of the HMD 101.

The RAM 403 is used as a work area when the CPU 406 executes various kinds of processing, and is also used as an area for temporarily storing data received from an external apparatus (for example, the image processing apparatus 103) via the I/F 206. The ROM 404 stores programs and data executed by the CPU 406. A bus 409 interconnects the respective units of the HMD 101.

The aberration correction LSI (Large Scale Integration) 408 is a dedicated integrated circuit (ASIC) which executes correction processing of aberrations (for example, distortion aberrations and chromatic aberrations of magnification). That is, the image capture system aberration correction unit 204 and display system aberration correction unit 207 shown in FIG. 3 are implemented by this integrated circuit. Note that this embodiment will exemplify a case in which aberrations are corrected by the dedicated integrated circuit. Alternatively, this function may be implemented in software by a DSP (Digital Signal Processor) as a signal processing processor.

Overviews of distortion aberrations and chromatic aberrations of magnification will be explained first with reference to FIGS. 6A to 6C.

Figure 6A:
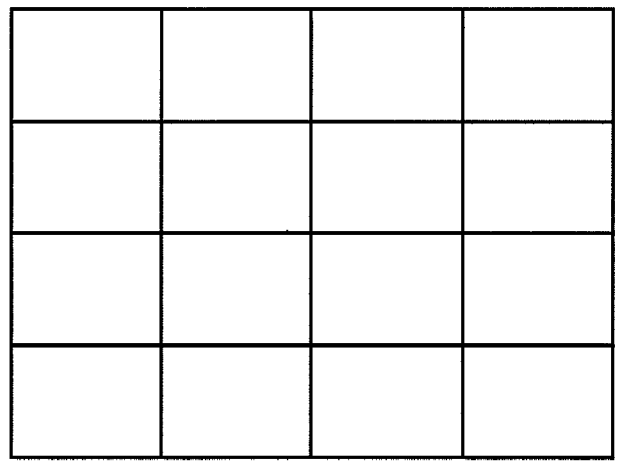
FIGS. 6A to 6C are views showing overviews of distortion aberrations and chromatic aberrations of magnification.
Figure 6B:
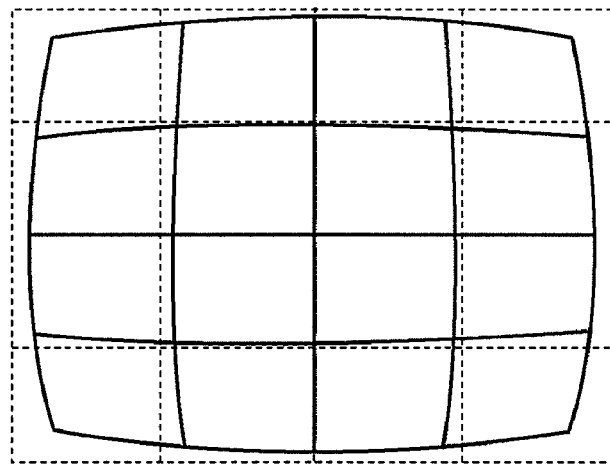
Figure 6C:
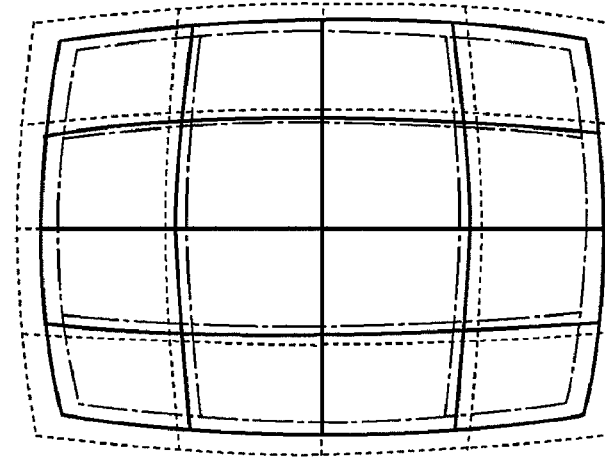

FIG. 6A shows an image free from any distortion, FIG. 6B shows a distorted image, and FIG. 6C shows an image which suffers chromatic aberrations of magnification in addition to distortion aberrations. In FIG. 6C, of RGB three primary colors, Green is indicated by the solid line, Red is indicated by the broken line, and Blue is indicated by the one-dashed chain line. This is because the refractive indices of a lens are different depending on the wavelengths of Red, Green, and Blue. In the image capture optical system, a phenomenon whereby a Red image is formed outside a Green image, and a Blue image is formed inside the Green image occurs, and even a monochrome object image may suffer color bleeding (color misregistration) at its edge. Also, even an object of a color image suffers similar color bleeding at an edge part such as a boundary region where a color appearance changes.

In image formation via a real lens, upon capturing a figure shown in FIG. 6A, a phenomena whereby an image is distorted, and image forming positions (magnifications) differ depending on colors occur, as shown in FIG. 6C. The former for a single color is called distortion aberrations, and magnification differences due to color differences are called chromatic aberrations of magnification.

Light is refracted more conspicuously with decreasing wavelength. In the image capture optical system that images a convex lens, a red image deviates outside a green image. By contrast, in the display optical system as an enlargement optical system, a blue image deviates outside a green image. Digital aberration correction processing corrects such images in a direction opposite to the deviation direction. For example, in case of aberration correction for the display optical system, aberrations of the optical system are canceled by forming an image in which a blue image is laid out inside a green image and a red image is laid out outside the green image, thus obtaining a preferred image free from any color misregistration at the pupil position.

Figure 7:
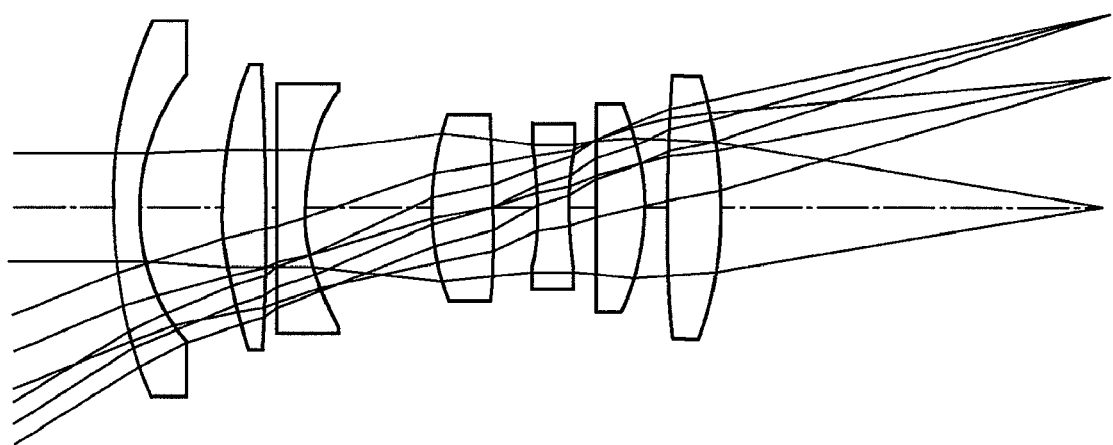
FIG. 7 is a view showing an overview of an image capture unit 203 (image capture optical system) shown in FIG. 3.
Figure 8:
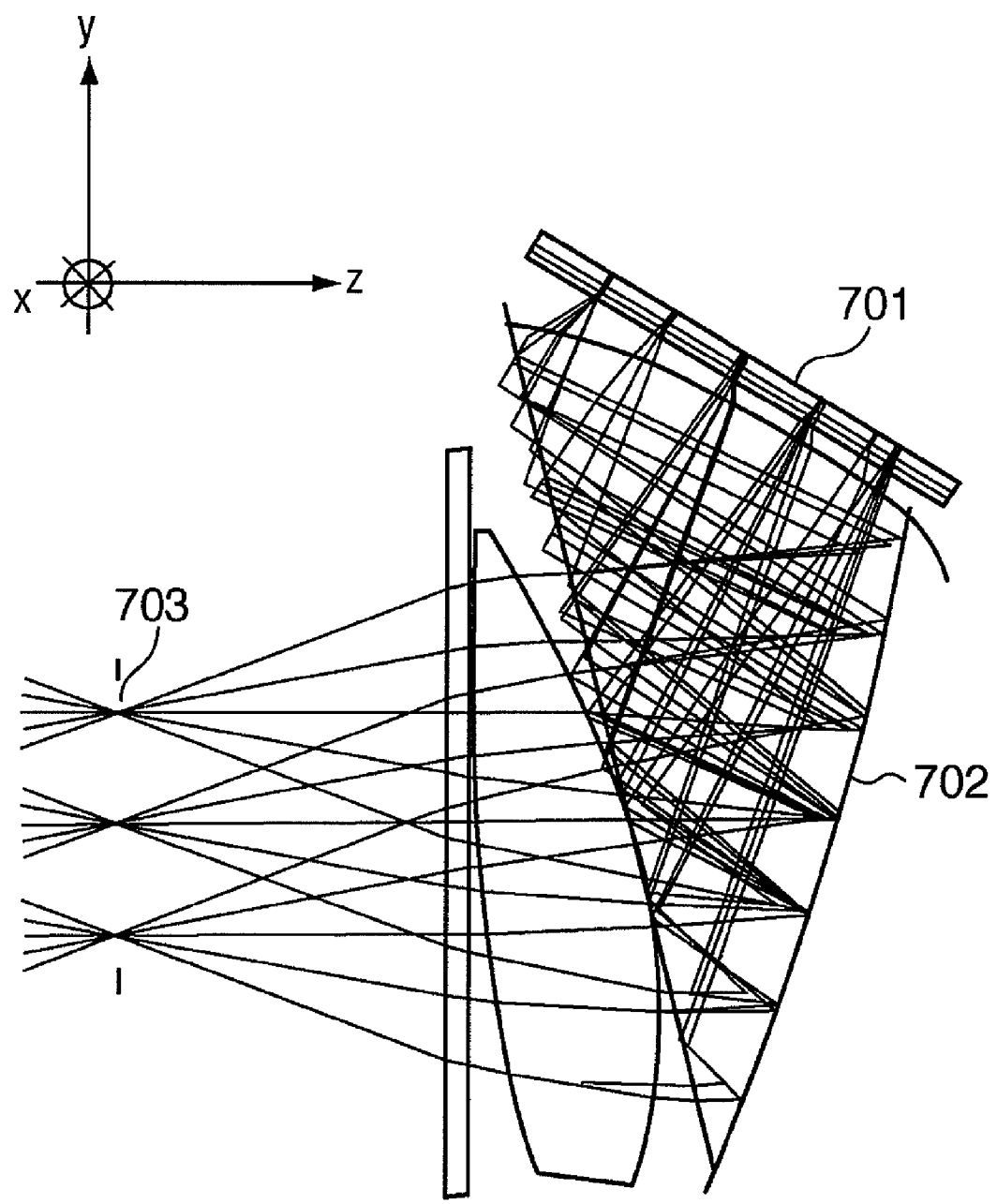
FIG. 8 is a view showing an overview of the image capture unit 203 (display optical system) shown in FIG. 3.

An overview of the optical systems will be described below with reference to FIGS. 7 and 8. FIG. 7 is an optical path sectional view of the image capture optical system, and FIG. 8 shows the arrangement of the display optical system.

Reference numeral 701 denotes a (compact) display panel. On this panel, an image to be presented to the operator is formed. The display panel 701 includes, for example, a TFT liquid crystal or organic EL panel. When the display panel 701 includes a TFT liquid crystal panel, it is irradiated with light coming from a backlight (not shown) as a light source via respective color filters. When the display panel 701 includes an organic EL device, the need for a backlight is obviated because of self luminescence.

Reference numeral 702 denotes a free curvature prism, which enlarges rays from the (compact) display panel 701 and guides them to the pupil. The free curvature prism 702 can realize a low-profile, compact structure compared to a mere lens. Reference numeral 703 denotes an image forming position of an image formed by the display panel. By setting the pupil at that position, the operator can observe a display image obtained by enlarging an image on the display panel 701.

The overview of the optical systems has been described. Note that the influences of various aberrations generated in an optical system are generally suppressed by a plurality of lens groups. However, in order to attain a size reduction of the HMD, simplification and size and weight reductions of the optical system are required. For this reason, it is effective to design a cooperative system which digitally corrects various aberrations.

Figure 9:
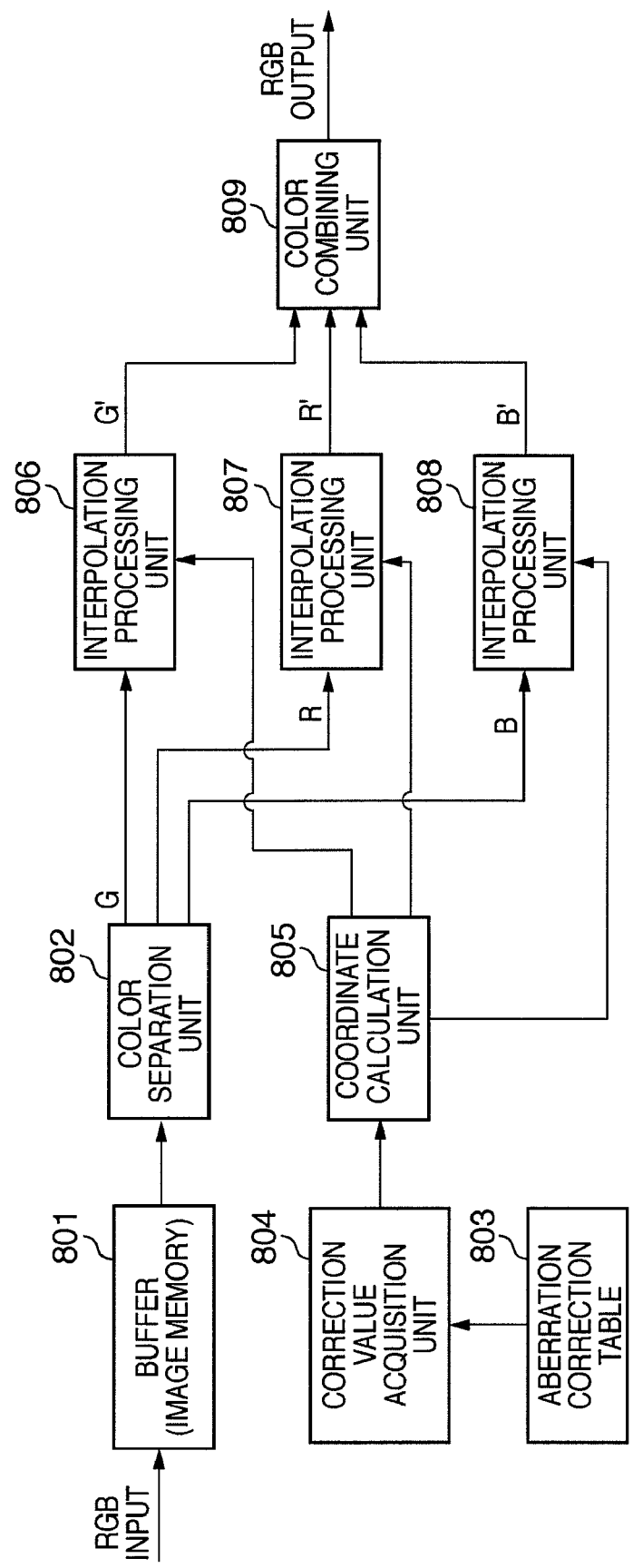
FIG. 9 is a block diagram showing an example of the functional arrangement in an aberration correction LSI 408 shown in FIG. 5.

FIG. 9 is a block diagram showing an example of the functional arrangement in the aberration correction LSI 408 shown in FIG. 5. That is, FIG. 9 shows an example of the functional arrangement implemented in each of the image capture system aberration correction unit 204 and display system aberration correction unit 207.

The aberration correction LSI 408 includes a buffer 801, color separation unit 802, aberration correction table 803, correction value acquisition unit 804, coordinate calculation unit 805, interpolation processing units 806 to 808, and color combining unit 809.

The buffer 801 stores image data including pixels each having RGB color components. The color separation unit 802 reads out a pixel value at desired coordinates (address) from the buffer, and separates it into RGB color components.

The aberration correction table 803 holds correspondence between pixel positions before and after coordinate conversion. More specifically, the aberration correction table 803 stores correction values required to calculate coordinate values after conversion, which correspond to the coordinate positions of representative points to be converted (to be also referred to as reference points hereinafter). The aberration correction table 803 stores coordinates after conversion in association with a specific color, and also stores differences with reference to this specific color for colors other than the specific color, so as to reduce its size. Note that details of the aberration correction table 803 will be described later.

The correction value acquisition unit 804 acquires a correction value of each color. The correction value acquisition unit 804 determines reference points of a pixel to be displayed, and reads out coordinates to which the reference points are converted from a reference table, that is, the aberration correction table 803. Note that the correction value acquisition unit 804 reads out correction values required to calculate converted coordinates corresponding to the coordinates of the reference points.

The coordinate calculation unit 805 calculates coordinates after conversion of respective colors based on the correction values acquired by the correction value acquisition unit 804. The coordinate calculation unit 805 calculates coordinates after conversion by an interpolation calculation using the Lagrange interpolation formula.

Each of the interpolation processing units 806, 807, and 808 calculates new color information at an interpolation position based on the coordinates after conversion and a corresponding color value of an original pixel. The interpolation processing unit 806 calculates new color information for Green, the interpolation processing unit 807 calculates new color information for Red, and the interpolation processing unit 808 calculates new color information for Blue. Note that the interpolation position indicates a pixel position on the display panel in case of the display optical system.

The color combining unit 809 combines color information of a pixel to be displayed based on the pieces of new color information at the interpolation position, which are respectively calculated by the interpolation processing units 806 to 808. For example, when there is 8-bit input data per color, the color combining unit 809 outputs pixel data of a total of 24 bits by combining pixel data after conversion.

The functional arrangement in the aberration correction LSI 408 has been explained. Although not shown in FIG. 9, a low-pass filter or format conversion unit may be arranged to execute pre-processing. Since the low-pass filter can remove high-frequency components, it can eliminate the influence of aliasing. The format conversion unit converts an input image into a format that allows aberration correction processing. For example, when luminance and color difference signals are input, the format conversion executes processing for reconfiguring pixels into respective color components. Post-processing such as emphasis processing using a filter, color appearance correction, and conversion into a final image format may be added as needed.

Figure 10:
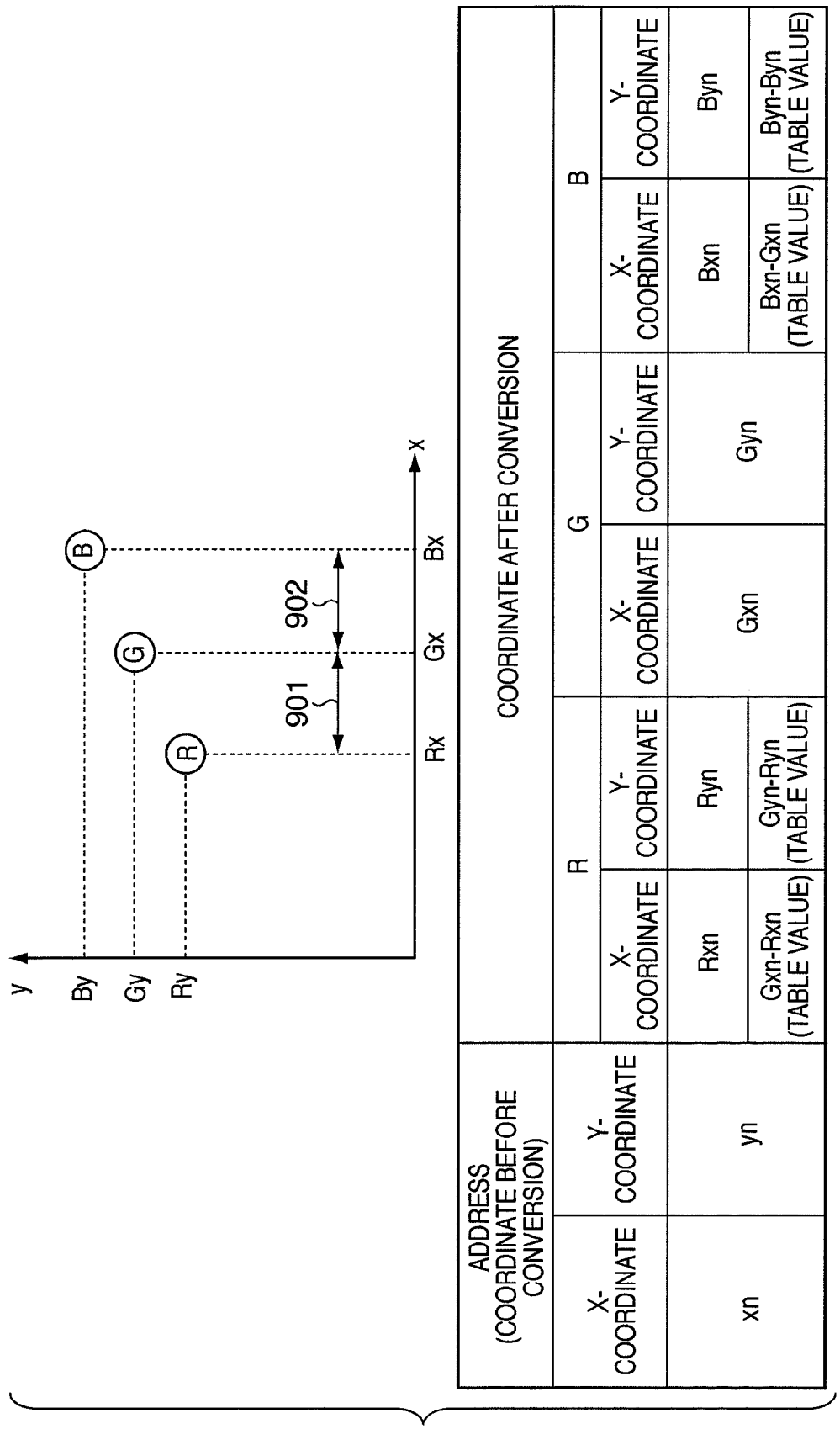
FIG. 10 is a view showing an example of an aberration correction table 803 shown in FIG. 9.

FIG. 10 is a view showing an example of the aberration correction table 803 shown in FIG. 9.

The aberration correction table 803 stores an address of a reference position as coordinates before conversion and difference values of coordinates (address) after conversion in correspondence with each other. By designating X-Y coordinates of a desired pixel by a reference address, coordinates after conversion can be obtained for a reference color (G in this embodiment), and difference values (table storage values) from the reference color can be obtained for other colors (R and B) other than the reference color. An R coordinate can be calculated from a stored difference value 901 (Gx−Rx) from G, and a coordinate Gx after conversion of G, and a B coordinate can be calculated from a stored difference value 902 (Bx−Gx) from G, and the coordinate Gx of G.

The example of the aberration correction table 803 has been explained. In this embodiment, a case will be exemplified wherein coordinates before conversion are also held in a table. However, the present invention is not limited to this. For example, when coordinates before conversion are associated with addresses at the time of memory access, they need not be held in the table, and the memory size can be reduced.

Figure 11:
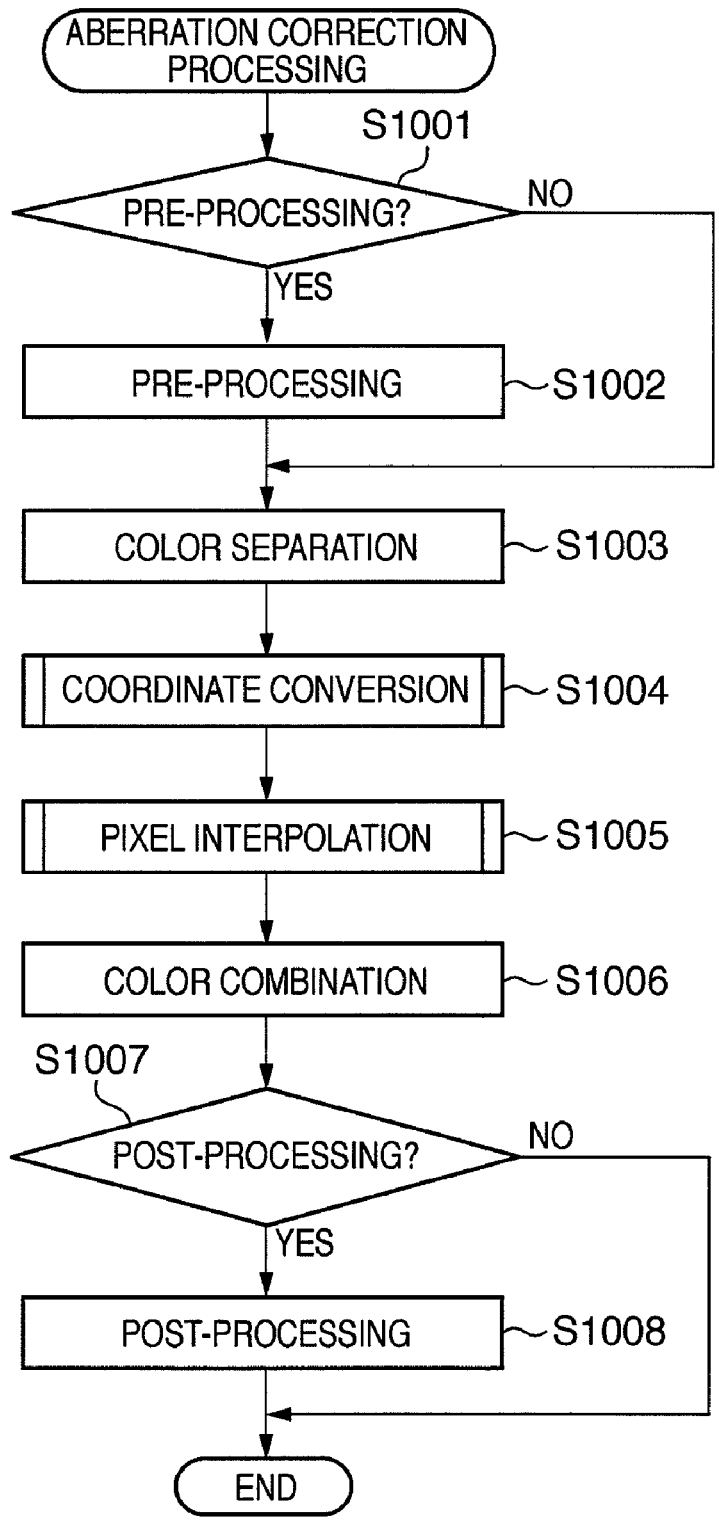
FIG. 11 is a flowchart showing an example of the sequence of processing executed when the aberration correction LSI 408 shown in FIG. 5 corrects aberrations.

FIG. 11 is a flowchart showing an example of the sequence of processing executed when the aberration correction LSI 408 shown in FIG. 5 corrects aberrations. Note that this processing is carried out by the image capture system aberration correction unit 204 and display system aberration correction unit 207 shown in FIG. 3, respectively.

The aberration correction LSI 408 checks in step S1001 if pre-processing is carried out as a previous stage of aberration correction. The pre-processing includes application of a low-pass filter to remove moiré, and conversion processing into an image format that allows application of chromatic aberration correction. If the pre-processing is to be carried out, the process advances to step S1002; otherwise, the process jumps to step S1003.

In step S1002, the aberration correction LSI 408 carries out the pre-processing as the previous stage of the aberration correction.

In step S1003, the aberration correction LSI 408 controls the color separation unit 802 to separate information of a pixel including RGB three primary colors into those for respective color planes, that is, respective colors. In this embodiment, information of a pixel is separated into those for RGB three primary colors. However, when the aberration correction table itself stores correction data indicating deviation amounts of other colors, information may be separated into those for colors other than RGB (for example, CMYK of a complementary color system).

In step S1004, the aberration correction LSI 408 controls the coordinate calculation unit 805 to execute coordinate conversion processing, as will be described in detail later. The coordinate conversion processing calculates a position to which an image forming position deviates for each color of each pixel, or a layout position of a pixel so as to guide that pixel to an ideal image forming position, and calculates coordinates after conversion.

In step S1005, the aberration correction LSI 408 controls the interpolation processing units 806 to 808 to execute pixel interpolation processing, as will be described in detail later. The pixel interpolation processing reconfigures a pixel value at a new configuration position (interpolation position) based on the converted coordinates obtained by the processing in step S1004 and pixel information of reference pixels. For example, since a pixel can only be displayed at a prescribed pixel position on the display panel, the pixel value is reconfigured in correspondence with that position.

In step S1006, the aberration correction LSI 408 controls the color combining unit 809 to recombine color information of a new pixel. Note that this color information recombining processing is executed based on the converted coordinates and the color information of a pixel that has undergone pixel interpolation for respective colors.

The aberration correction LSI 408 checks in step S1007 if post-processing is carried out as a subsequent stage of the aberration correction processing. The post-processing includes, for example, emphasis processing and color correction. If the post-processing is to be carried out, the process advances to step S1008; otherwise, this processing ends.

In step S1008, the aberration correction LSI 408 applies post-processing to an image after aberration correction. After that, this processing ends.

Figure 12:
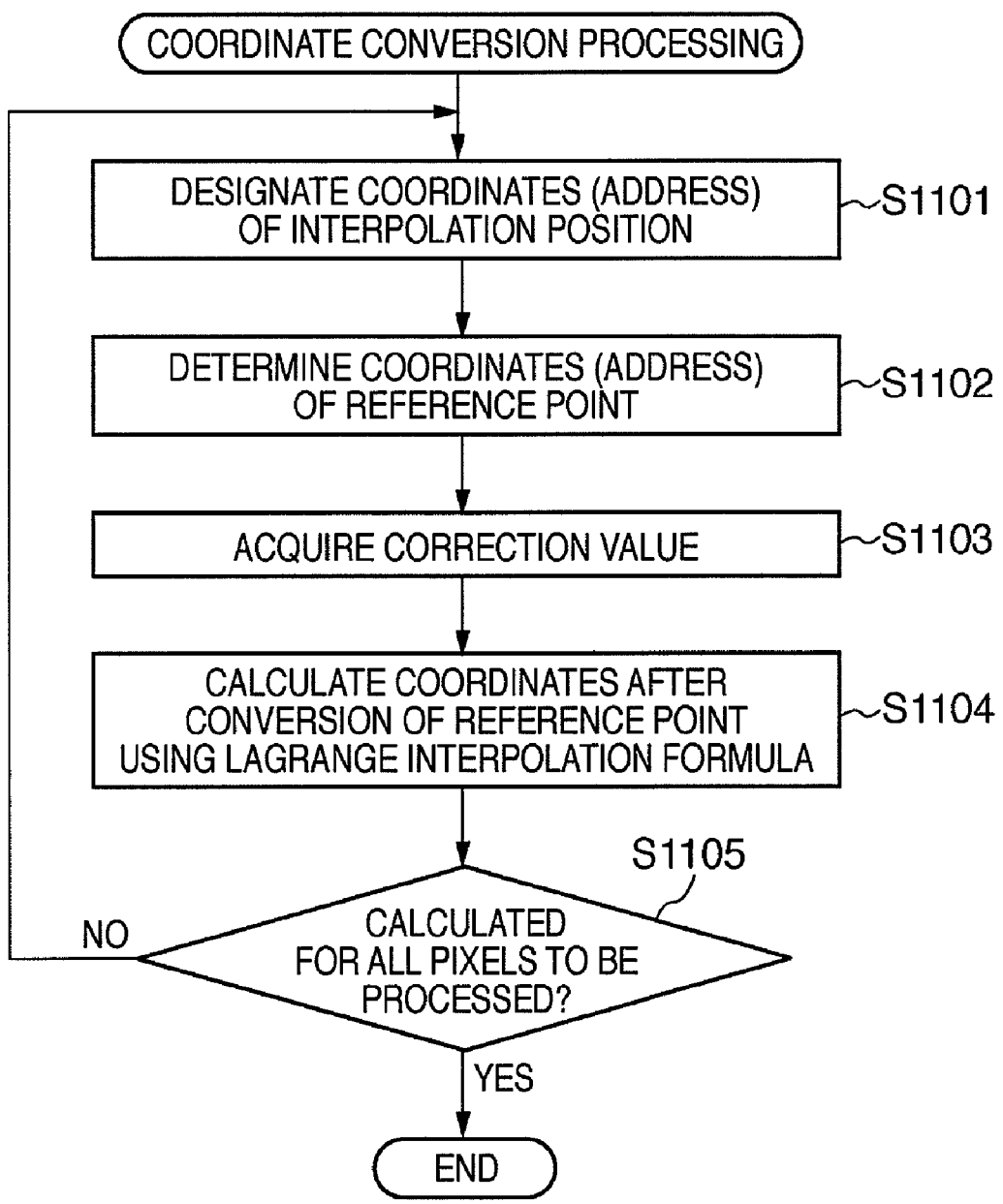
FIG. 12 is a flowchart showing an example of the sequence of coordinate conversion processing in step S1004 shown in FIG. 11.

FIG. 12 is a flowchart showing an example of the sequence of the coordinate conversion processing in step S1004 shown in FIG. 11.

In step S1101, the aberration correction LSI 408 controls the coordinate calculation unit 805 to designate coordinates of an interpolation position, which is used as an address of an interpolation pixel.

In step S1102, the aberration correction LSI 408 controls the coordinate calculation unit 805 to designate coordinates of reference pixels. In this case, after the coordinates of the interpolation position are designated, the reference pixels are designated. However, this processing order is not particularly limited, and the processing of step S1101 and that of step S1102 may be replaced.

In step S1103, the aberration correction LSI 408 controls the coordinate calculation unit 805 to acquire correction values required to obtain addresses after conversion of the reference points from the aberration correction table 803.

In step S1104, the aberration correction LSI 408 controls the coordinate calculation unit 805 to acquire coordinates after conversion of respective colors in the reference pixels based on the values which are obtained by the processing of step S1103 and are stored in the aberration correction table 803. That is, in case of distortion aberrations, coordinates after conversion of respective colors in the reference pixels are acquired based on the deviation of a pixel. When values stored in the aberration correction table 803 are those for chromatic aberrations, coordinates after conversion of respective colors in the reference pixels are acquired based on color misregistration amounts required to calculate the coordinates after conversion of respective colors. That is, since each reference point corresponds to the value of a decimated representative point (representative point value), a value between reference points is calculated by an interpolation calculation. Details of this interpolation calculation will be described later. For example, the calculation is made by applying up to a cubic formula of the Lagrange interpolation formula.

The aberration correction LSI 408 controls the coordinate calculation unit 805 to check in step S1105 if the coordinate conversion processing is applied to all pixels to be processed. If the processing is complete for all the pixels, this coordinate conversion processing ends. Otherwise, the process returns to step S1101 to repetitively execute the aforementioned processing again.

The interpolation calculation using the Lagrange interpolation formula will be described below.

Figure 13:
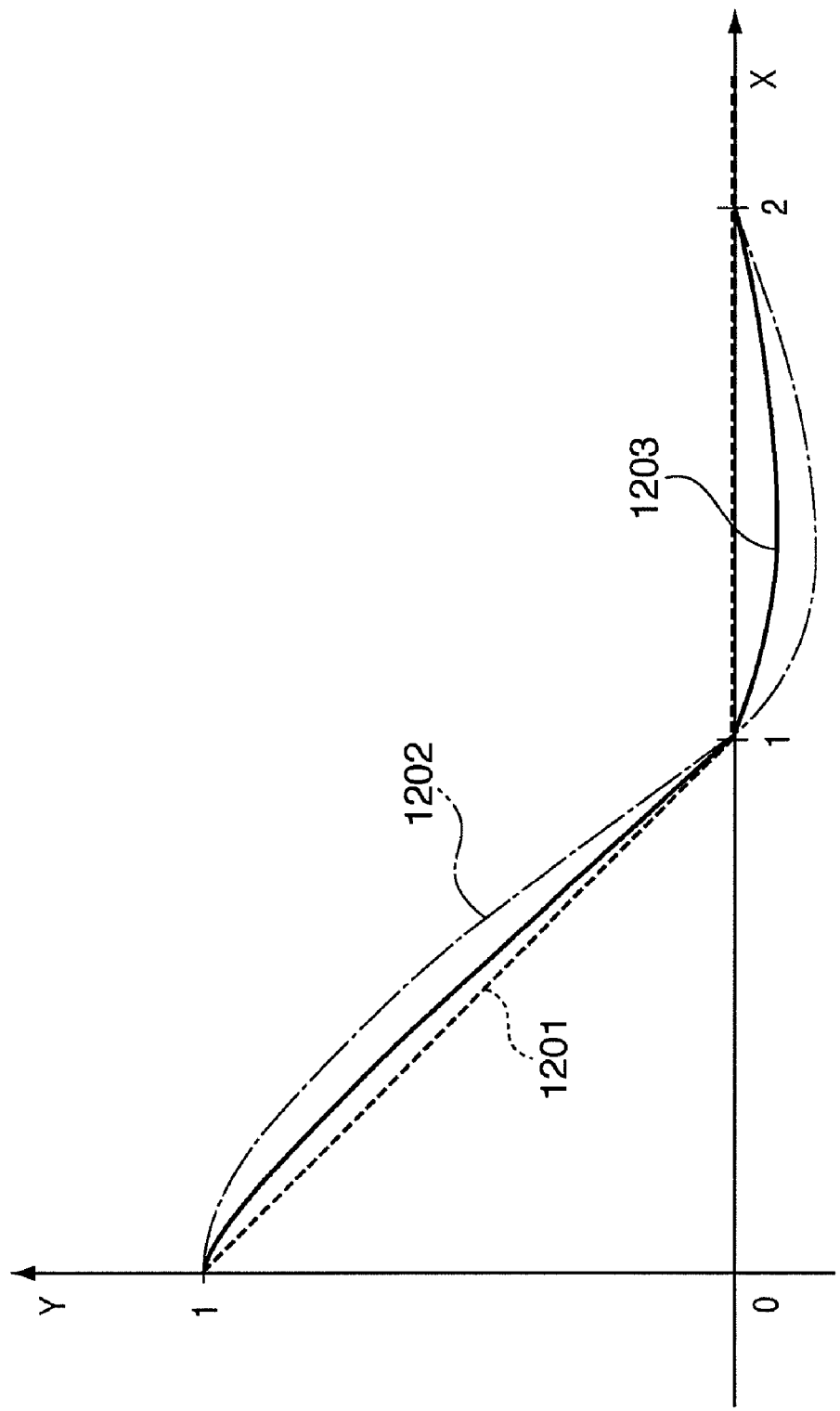
FIG. 13 is a graph showing an example of a Lagrange interpolation curve.

FIG. 13 is a graph showing an example of a Lagrange interpolation curve. FIG. 13 shows an interpolation curve and line for the sake of comparison in addition to a curve defined by the Lagrange interpolation formula. A dashed line indicates a linear line 1201 of linear interpolation, a one-dashed chain line indicates a bicubic interpolation curve 1202 which assures a high sharpness of cubic interpolation curves, and a solid line indicates a Lagrange interpolation curve 1203 as a current target. Numerical values on axes are values normalized by a pixel interval. Relational expressions between surrounding reference points and a new point (interpolation point) are respectively given as follows. Note that the concept of the interpolation calculation will be described later.

Linear interpolation line (linear interpolation from surrounding four points)

$$[0 \leq x \leq 1] y = 1-x \tag{1}$$

$$[1 \leq x \leq 2] y = 0 \tag{2}$$

Bicubic interpolation curve (bicubic interpolation from surrounding 16 points)

$$[0 \leq x \leq 1] y = 1 - 2x^2 + x^3 \tag{3}$$

$$[1 \leq x \leq 2] y = 4 - 8x + 5x^2 - x^3 \tag{4}$$

Lagrange interpolation curve (bicubic interpolation from surrounding 16 points)

$$[0 \leq x \leq 1] \tag{5}$$
$$y = \frac{1}{2}(x-2)(x+1)(x-1)$$
$$= 1 - \frac{1}{2}x - x^2 + \frac{1}{2}x^3$$

$$[1 \leq x \leq 2] \tag{6}$$
$$y = -\frac{1}{6}(x-3)(x-2)(x-1)$$
$$= 1 - \frac{11}{6}x + x^2 - \frac{1}{6}x^3$$

As can be seen from these relational expressions, the Lagrange interpolation curve draws a curve approximate to the linear interpolation compared to the bicubic curve as a similar bicubic interpolation curve. This indicates that when interpolation processing using this interpolation curve is applied to an image, sharpness lowers, that is, a blurred image is formed. The bicubic curve draws a locus approximate to a sine function which is well-known as an interpolation curve.

Figure 14:
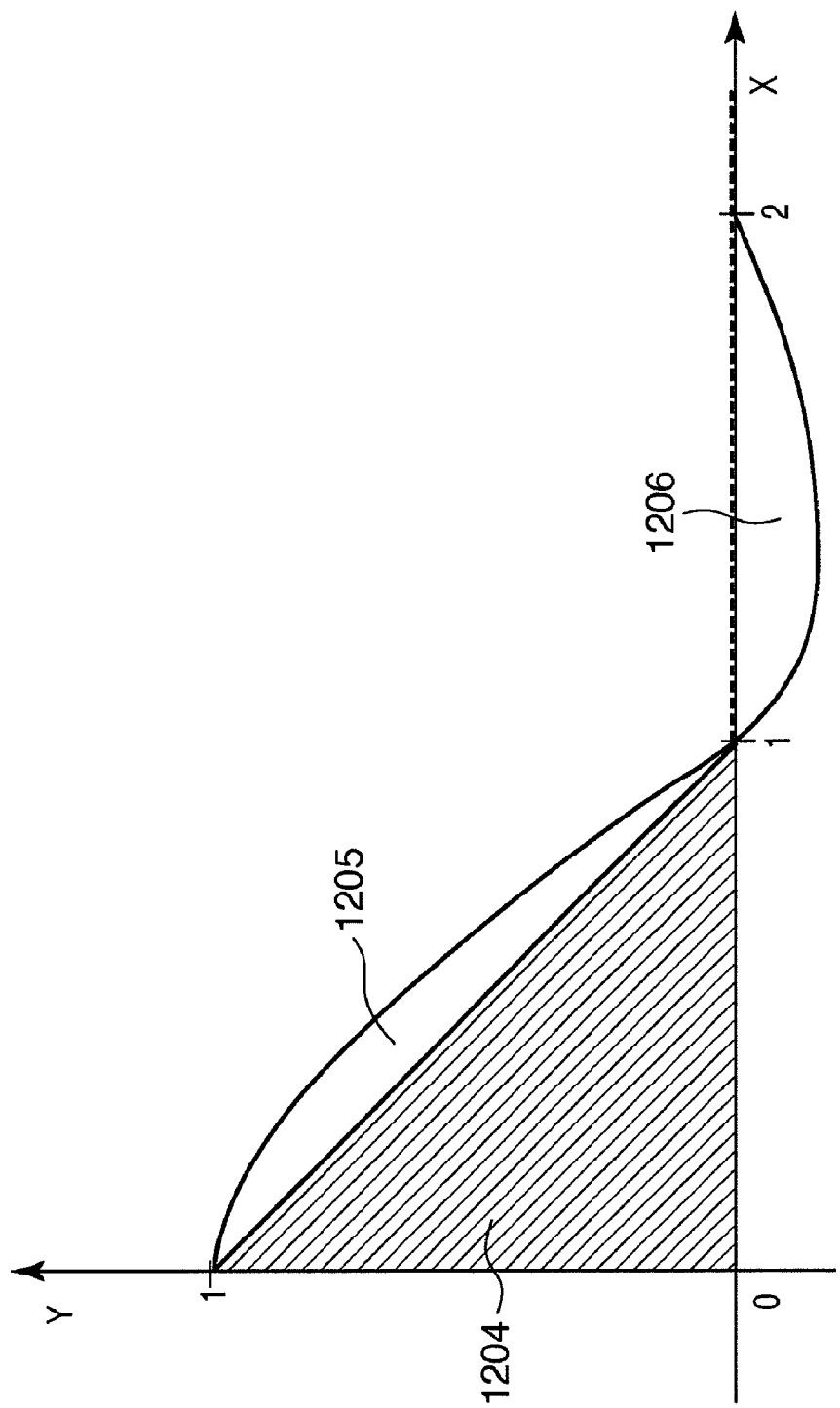
FIG. 14 is a graph showing an example of a bicubic interpolation curve.

FIG. 14 is a graph showing an example of the relationship of an area of a portion bounded by a curve indicating the sharpness upon application to an image and the linear interpolation line. FIG. 14 exemplifies a bicubic interpolation curve. A hatched portion 1204 is bounded by the respective axes and the linear interpolation line, and has an area=0.5. By contrast, the bicubic interpolation curve draws a locus above the line within the range of $0 \leq x \leq 1$, and below the line within the range of $1 \leq x \leq 2$. At this time, letting 1205 be an area of a portion bounded by the curve and line within the range of $0 \leq x \leq 1$, and 1206 be that of a portion bounded by the curve and line within the range of $1 \leq x \leq 2$, then the respective areas can be calculated as definite integrals in respective intervals.

Calculating formulas of the areas and their values for the bicubic and Lagrange curves are as follows.

Bicubic interpolation curve (bicubic interpolation from surrounding 16 points)

$[0 \le x \le 1]$ (area 1205)

$$S = \int_a^b (x^3 - 2x^2 + 1)dx - 0.5$$
$$= \left[\frac{1}{4}x^4 + \frac{2}{3}x^3 + x\right]_0^1 - 0.5$$
$$= 0.083333$$

$[1 \le x \le 2]$ (area 1206)

$$S = \int_a^b (-x^3 + 5x^2 - 8x + 4)dx$$
$$= \left[-\frac{1}{4}x^4 + \frac{5}{3}x^3 + 4x^2 + 4x\right]_1^2$$
$$= 0.083333$$

Lagrange interpolation curve (bicubic interpolation from surrounding 16 points)

$[0 \le x \le 1]$ (area 1205)

$$S = \int_a^b \left(\frac{1}{2}x^3 - x^2 - \frac{1}{2}x + 1\right)dx - 0.5$$
$$= \left[\frac{1}{8}x^4 - \frac{1}{3}x^3 - \frac{1}{4}x^2 + x\right]_0^1$$
$$= 0.041666$$

$[1 \le x \le 2]$ (area 1206)

$$S = \int_a^b \left(-\frac{1}{6}x^3 + x^2 - \frac{11}{6}x + 1\right)dx$$
$$= \left[-\frac{1}{24}x^4 + \frac{1}{3}x^3 - \frac{11}{12}x^2 + x\right]_1^2$$
$$= 0.041666$$

As can be seen from these results, both the areas 1205 and 1206 assume the same numerical values (0.041666 . . . ) less than or equal to 0.042. In the interpolation processing with respect to an image, a higher sharpening effect is produced with increasing values of the areas 1205 and 1206. Conversely, in processing that requires continuity like in the interpolation processing at the time of coordinate conversion, conversion errors tend to become larger with increasing numerical values. Both the curve and line have inflection points at x=1, and a cubic curve is relatively smoothly connected. The linear interpolation line seems to be ideal in terms of conversion errors, and tends to locally have large conversion errors due to discontinuity at the inflection point. Generally, a free curve including a cubic curve that smoothly connects at an inflection point can reduce conversion errors.

From the aforementioned two tendencies, a curve, which assumes values approximate to those of the linear interpolation line and has a smooth connection at an inflection point can reduce conversion errors. In this case, the Lagrange interpolation curve is ideal.

Note that other cubic interpolation curves can be classified depending on the sharpness levels and the values when x=0 as follows.

Bicubic, sinc: sharpness=high, y=1 when x=0 Lanczos, Hermit: sharpness=middle, y=1 when x=0

Michell, Bell, B-spline: sharpness=low, y≠1 when x=0

Among many interpolation curves, the Lagrange interpolation curve shows a tendency of minimizing conversion errors when it is used in interpolation processing of an optical system.

Simulation results of coordinate conversion errors for different representative point intervals upon adopting various interpolation curves using lens optical design values can be compared as follows.

| Interpolation curve (line) | Representative point interval | Conversion error ($10^{-4}$ pixel interval) | |
|---|---|---|---|
| | | Average value | Maximum value |
| Linear | 32 × 32 | 389 | 1397 |
| | 64 × 64 | 1613 | 5204 |
| Bicubic | 32 × 32 | 1276 | 8174 |
| | 64 × 64 | 3126 | 17826 |
| Spline | 32 × 32 | 76 | 253 |
| | 64 × 64 | 292 | 929 |
| Lagrange | 32 × 32 | 3 | 34 |
| | 64 × 64 | 36 | 168 |
| Polynomial (degree 12) | — | 39 | 139 |

As shown in this table, when the representative point interval as a sampling interval is broadened, the conversion precision normally abruptly drops. However, as can be seen from the table, the Lagrange interpolation curve maintain a state in which conversion errors are reduced. This table additionally shows the polynomial approximation result having coefficients of degree 12 as a control, and conversion errors of the Lagrange interpolation curve are equivalent to this polynomial approximation even at the 64-pixel interval (an interval about 4 times a range that can be normally used).

In this manner, by adopting the Lagrange interpolation curve in the interpolation processing at the time of coordinate conversion, conversion errors can be drastically reduced if the representative point interval remains the same, or the representative point interval can be broadened if conversion errors remain the same. As a result, the correction table size can be reduced, that is, the memory size can be greatly reduced, and the memory access frequency can also be reduced. Then, the degrees of freedom in design can be increased, the circuit scale can be reduced, and power savings can be achieved, thus contributing to a size reduction.

Figure 15:
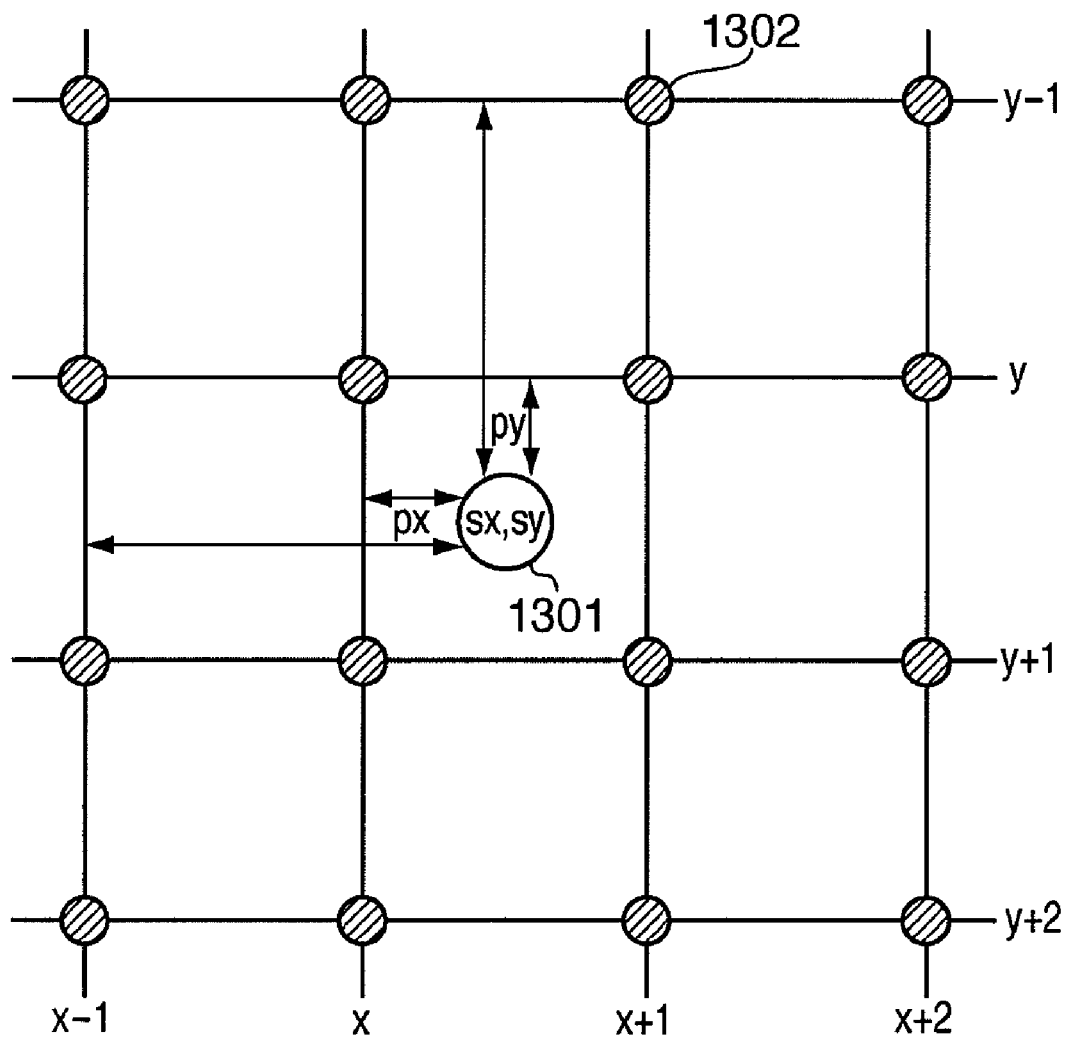
FIG. 15 is a view showing the concept of cubic interpolation.

FIG. 15 is a view showing the concept of cubic interpolation. The concept of cubic interpolation will be described as interpolation processing as processing for calculating a new pixel value at an interpolation position.

Based on distortion aberration information, chromatic aberration information, and resolution information of a lens, which has display central coordinates o(x0, y0) as an origin on a two-dimensional coordinate system, a position deviation amount at the position of each pixel on the two-dimensional coordinate system is calculated. That is, coordinate conversion amounts in the x- and y-axis directions, which are required to apply correction by the position deviation amount, are calculated for each pixel. This is coordinate conversion processing.

Pixel data (RGB values) at an original position of each pixel on the two-dimensional coordinate system are calculated by an interpolation calculation based on the positions and color information of respective colors of each coordinate-converted pixel. In the interpolation calculation, an x-coordinate "sx" and y-coordinate "sy" of an interpolation pixel 1301 are designated, and normalized distances "px" and "py" between reference points and the interpolation pixel are calculated. Then, weighting coefficients using the distances "px" and "py" are calculated at coordinates "x" and "y". A cubic function used in this calculation is defined by an interpolation curve based on the aforementioned cubic formula, and is defined by cubic interpolation formulas (3) and (4) in case of the bicubic interpolation curve or by formulas (5) and (6) in case of the Lagrange interpolation curve.

The values "px" and "py" are substituted in the cubic formulas in correspondence with the coordinates "x" and "y" to calculate the weighting coefficients of the reference points. Note that "px" and "py" are normalized. For example, when the interval between representative points as the reference points is defined by 16 pixels, "px" and "py" are normalized by a distance of 16 pixels. In FIG. 15, a portion bounded by the dotted line around the interpolation pixel 1301 is a normalized "1" region. The distances "px" and "py" between four reference points which exist on axes "y" and "y+1" and axes "x" and "x+1" and the interpolation pixel become smaller than 1. Conversely, 12 pixels around this region assume values between 1 and 2. The cubic formula used to calculate the weighting coefficients of four nearest neighbor pixels is formula (3) for the bicubic interpolation curve, and formula (5) for the Lagrange interpolation curve. The cubic formula used to calculate the weighting coefficients for 12 outer circumferential pixels is formula (4) for the bicubic interpolation curve, and formula (6) for the Lagrange interpolation curve. After these weighting coefficients are respectively calculated in the x- and y-directions, the pixel values of the reference points are multiplied by the "x" and "y" weighting coefficients, and the products are added for surrounding 16 pixels to calculate a new pixel value at the interpolation pixel.

In the example described above, the coordinates are calculated for respective colors and the interpolation calculation is made on the premise of chromatic aberration correction. Also, the same applies to correction of a distortion aberration alone, that is, a distortion. In this case, interpolation calculation processing is executed for one pixel without separating colors.

FIG. 16 is a view showing the concept of use of outer circumferential data.

The Lagrange interpolation requires the presence of reference points so as to improve its precision. In general, upon making an interpolation calculation, pixels of a surrounding region are referred to. For a pixel on the outermost circumference of an image region, there is no pixel to be referred to in practice, and arbitrary values to be referred to have to be prepared. When not so high precision is required, a method of using actual pixels of the outermost circumference as reference pixels which exist on the further outer side is available.

As for aberration correction, since an aberration amount, that is, a deviation amount of light rays increases toward the outer circumferential portion, coordinate conversion with higher precision is required. As for the Lagrange interpolation, the presence/absence of reference pixels largely influences the precision compared to other interpolation processes. For this reason, reference pixels are prepared in advance on the further outer side of the outermost circumference of an image region.

Reference numerals 1401a, 1401b, and 1401c denote reference points on the outermost circumference of an image region. Reference numeral 1402 denotes the coordinates of reference pixels which exist between the outermost circumferential reference points, and these coordinates are calculated by the interpolation calculation.

Reference numeral 1403 denotes reference pixels which are prepared on the further outer side of the image region. Since these pixels do not exist in practice, when optical design values are used as reference values of aberration correction, a design target has to be broadened to outside the image region. In some cases, a region to which no light ray can reach has to be used. Such region is calculated by creating an ideal state by simulation.

When actually measured values are used, since it is impossible to actually measure the coordinates of the outer circumferential reference points, the presence of outer circumferential reference points is predicted based on deviation amounts of actual pixels, and the predicted values are used. In practice, for example, a method of calculating a polynomial of higher degree as a curve that connects a plurality of existing points, and calculating coordinates at assumed positions may be used. In this manner, by preparing non-existing outer circumferential data for the interpolation processing, deviation amounts at the time of coordinate conversion of the outermost circumferential portion of the image region can be calculated more precisely.

Figure 17:
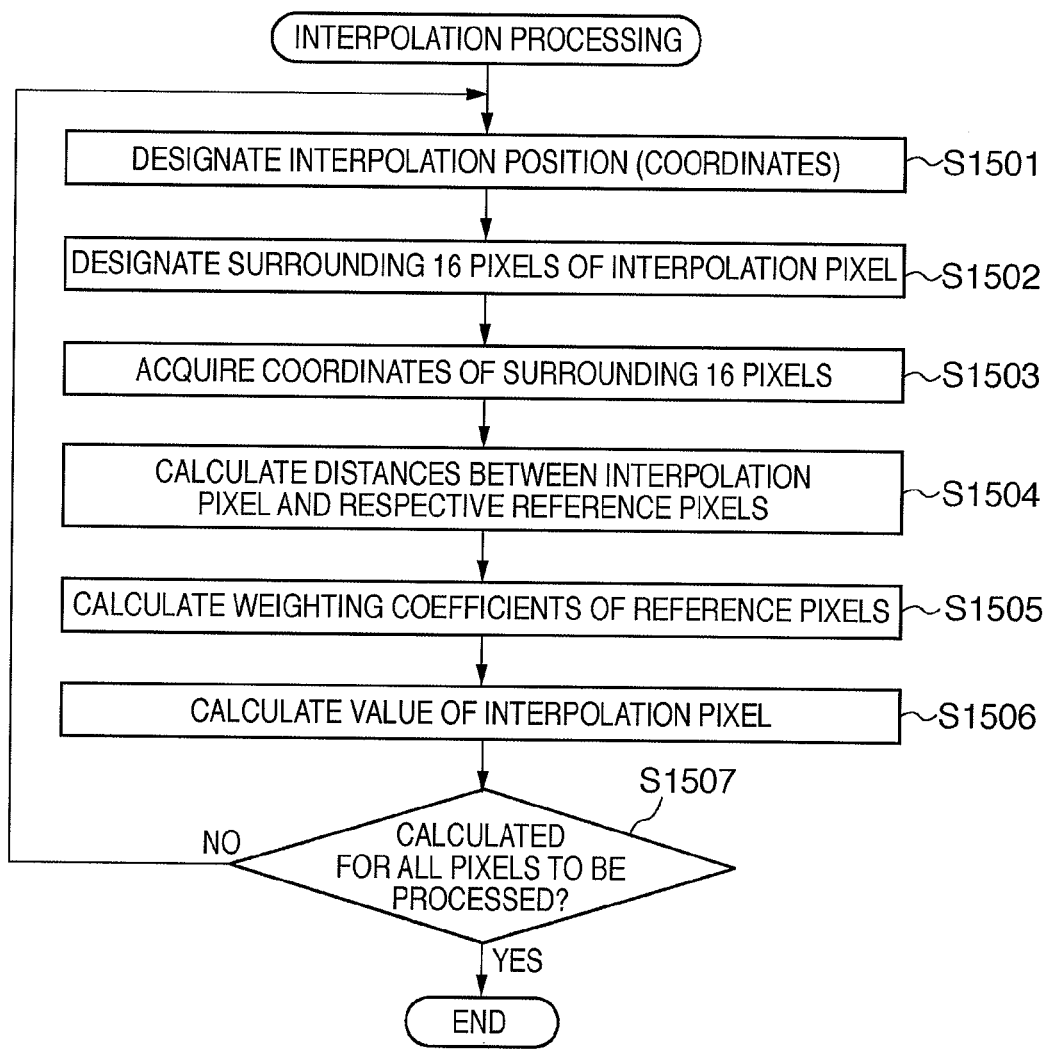
FIG. 17 is a flowchart showing an example of the sequence of pixel interpolation processing in step S1005 shown in FIG. 11.

FIG. 17 is a flowchart showing an example of the sequence of the pixel interpolation processing in step S1005 shown in FIG. 11.

In step S1501, the aberration correction LSI 408 controls the interpolation processing unit 806 to designate coordinates as a new interpolation position.

In step S1502, the aberration correction LSI 408 controls the interpolation processing unit 806 to designate reference pixels of 16 points, which exist around a new pixel to be generated at the interpolation position, that is, which fall within a predetermined range from the new pixel to be generated.

In step S1503, the aberration correction LSI 408 controls the interpolation processing unit 806 to acquire the coordinates of the surrounding 16 pixels as reference pixels.

In step S1504, the aberration correction LSI 408 controls the interpolation processing unit 806 to calculate the distances between the interpolation pixel and the respective reference pixels. Note that each distance is prepared as a value normalized by an interval between representative points. Since a two-dimensional space is to be processed, values for x- and y-coordinates are respectively calculated.

In step S1505, the aberration correction LSI 408 controls the interpolation processing unit 806 to calculate weighting coefficients of the respective reference points by substituting the distances calculated by the processing in step S1504 in an interpolation curve or line. In this case, it is assumed that the same cubic interpolation formula as that in the interpolation calculation at the time of coordinate conversion is to be adopted. Alternatively, a linear interpolation (bilinear) algorithm may be adopted.

In step S1506, the aberration correction LSI 408 controls the interpolation processing unit 806 to calculate the values of the interpolation pixel by adding the products of the values of the reference pixels and the weighting coefficients at the x- and y-coordinates. After that, this processing ends.

As described above, according to this embodiment, when aberrations (for example, distortion aberrations and chromatic aberrations) generated in the optical systems are corrected by coordinate conversion of pixels of an image, the Lagrange interpolation formula is used as the interpolation calculation algorithm used in the pixel coordinate conversion. Thus, even when the interval between representative points at coordinates to be converted is broadened, coordinate conversion errors can be suppressed. That is, even when the size of the aberration correction table is greatly reduced, high calculation precision can be maintained. Conversely, when a table size equivalent to that of a normal interpolation calculation can be assured, the calculation precision can be improved. For example, while satisfying conversion precision equivalent to that of a high-degree polynomial of degree 12, the circuit scale can be reduced to that slightly larger than that required for linear interpolation processing. As a result, since the circuit scale and memory access frequency can be reduced, cost and size reductions and power savings can be attained.

Second Embodiment

The second embodiment will be described below. Note that the apparatus arrangement of the second embodiment is the same as that shown in FIGS. 1 to 5 used to describe the first embodiment. Hence, a description thereof will not be repeated, and a difference will be described below. The difference lies in that the interpolation processing at the time of coordinate conversion and pixel interpolation processing are configured as independent functional blocks in the first embodiment, while a common interpolation processing functional block is used in the second embodiment.

Figure 18:
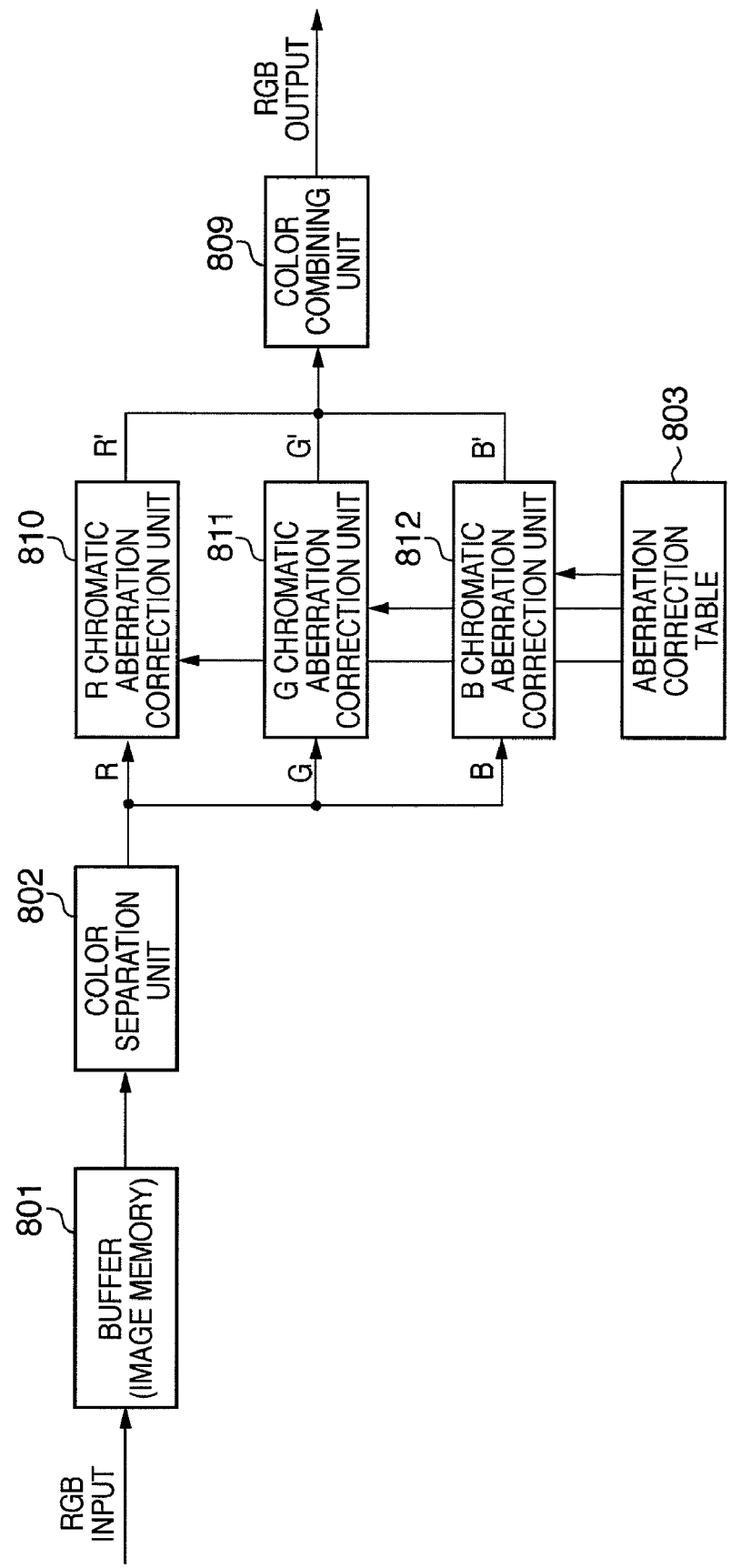
FIG. 18 is a block diagram showing an example of the functional arrangement of an aberration correction LSI 408 according to the second embodiment.

FIG. 18 is a block diagram showing an example of the functional arrangement in an aberration correction LSI 408 according to the second embodiment. Note that the same reference numerals in FIG. 18 denote the same components as in the functional arrangement shown in FIG. 9 used to explain the first embodiment, and a description thereof will not be repeated.

The aberration correction LSI 408 includes a buffer 801, color separation unit 802, aberration correction table 803, color combining unit 809, R chromatic aberration correction unit 810, G chromatic aberration correction unit 811, and B chromatic aberration correction unit 812. That is, in the arrangement of the second embodiment, the correction value acquisition unit 804, coordinate calculation unit 805, and interpolation processing units 806 to 808 are excluded from the arrangement of the first embodiment, and the R chromatic aberration correction unit 810, G chromatic aberration correction unit 811, and B chromatic aberration correction unit 812 are added.

The chromatic aberration correction units 810, 811, and 812 correct chromatic aberrations of respective colors. The chromatic aberration correction units 810, 811, and 812 execute coordinate conversion processing and pixel interpolation processing together with the correction of chromatic aberrations of respective colors.

Figure 19:
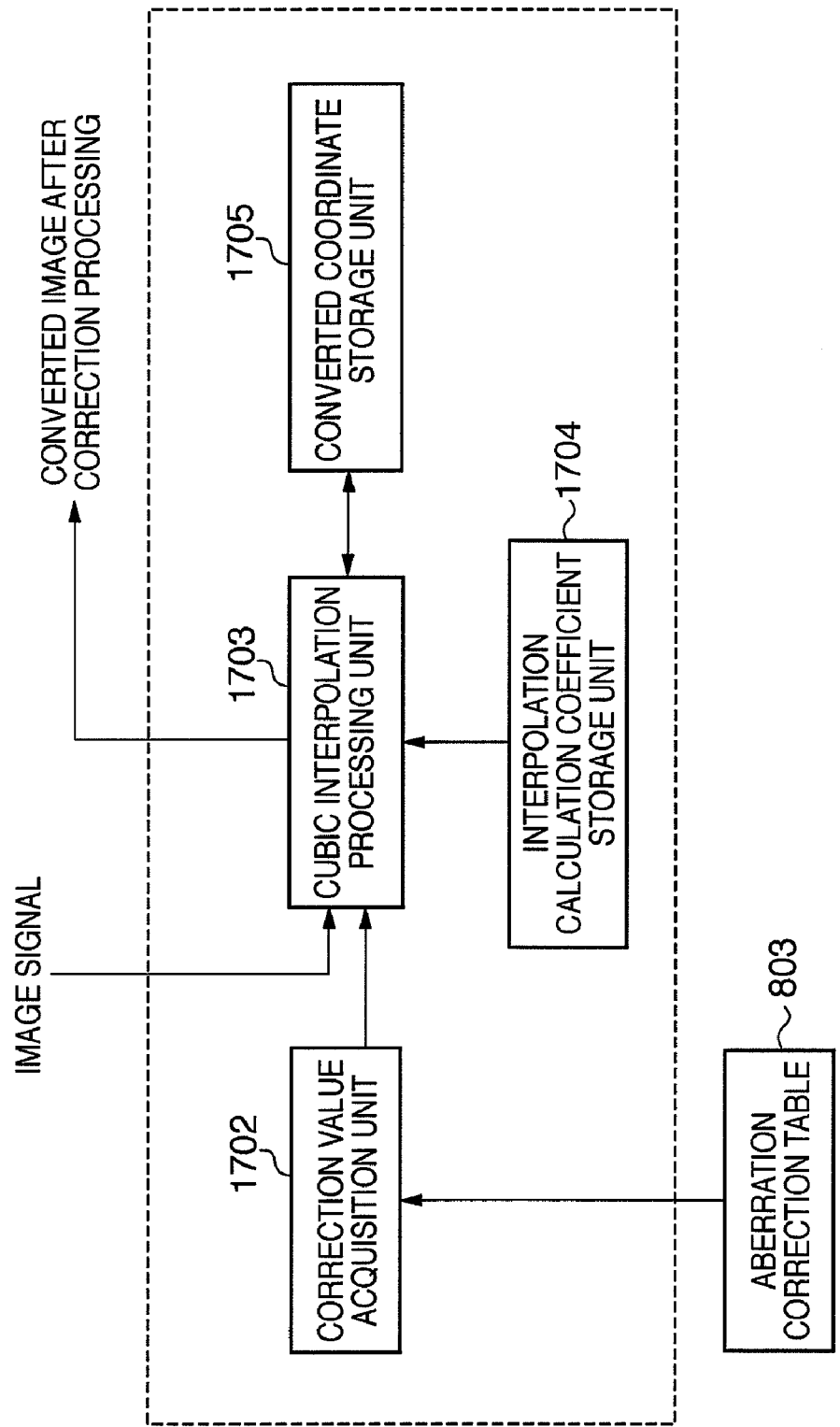
FIG. 19 is a block diagram showing an example of the functional arrangement in respective chromatic aberration correction units 810 to 812 shown in FIG. 18.

FIG. 19 is a block diagram showing an example of the functional arrangement in the chromatic aberration correction units 810 to 812 shown in FIG. 18.

Each of the chromatic aberration correction units 810 to 812 includes a correction value acquisition unit 1702, cubic interpolation processing unit 1703, interpolation calculation coefficient storage unit 1704, and converted coordinate storage unit 1705. Note that the correction value acquisition unit 1702 has the same functions as those of the correction value acquisition unit 804 shown in FIG. 9, and a description thereof will not be given.

The cubic interpolation processing unit 1703 executes interpolation processing at the time of coordinate conversion, and that at the time of pixel interpolation. More specifically, the cubic interpolation processing unit 1703 is a shared circuit which has a function of making a coordinate calculation based on the Lagrange interpolation used to calculate coordinates after color conversion, and a function of calculating new color information at an interpolation position based on the calculated coordinates after conversion and pieces of color information of reference pixels (an interpolation calculation based on cubic interpolation). Note that the coordinate calculation based on the Lagrange interpolation is made based on correction values which are selected by the correction value acquisition unit 1702 and are acquired from the aberration correction table 803. In this case, weighting coefficients for a cubic formula at the time of coordinate conversion and that at the time of pixel interpolation are acquired from the interpolation calculation coefficient storage unit 1704 to be described later. Note that the weighting coefficients to be acquired are switched depending on processing. This embodiment assumes the processing mode by means of hardware circuits. However, when signal processing circuits such as a DSP are used, they can be coped with by changing coefficient parameters.

The interpolation calculation coefficient storage unit 1704 stores weighting coefficients for the cubic formula used in the cubic interpolation processing unit 1703. The cubic interpolation processing unit 1703 reads out values stored in this unit as needed, and uses them as coefficient parameters in an interpolation calculation at the time of coordinate conversion, and that at the time of pixel interpolation.

For example, when the bicubic interpolation curve is used as a cubic interpolation curve, since the cubic formulas given by formulas (3) and (4) are used, coefficients are as follows.

$$[0 \leq x \leq 1]\{1,2,0,1\} \quad (7)$$

$$[1 \leq x \leq 2]\{-1,5,-8,4\} \quad (8)$$

Note that coefficients in a cubic formula $ax^3+bx^2+cx+d$ are described as $\{a, b, c, d\}$.

Likewise, when the Lagrange interpolation curve is used as a cubic formula, from formulas (5) and (6), coefficients are as follows.

$$[0 \leq x \leq 1]\left\{\frac{1}{2}, -1, -\frac{1}{2}, 1\right\} \quad (9)$$

$$[1 \leq x \leq 2]\left\{-\frac{1}{6}, 1, -\frac{11}{6}, 1\right\} \quad (10)$$

In this way, coefficient parameters (9) and (10) are used in the interpolation calculation at the time of coordinate conversion, and coefficient parameters (7) and (8) are used in the interpolation calculation at the time of pixel interpolation. Thus, by selecting coefficients according to the processing, different interpolation calculations can be executed.

The converted coordinate storage unit 1705 temporarily stores coordinates after conversion calculated by the cubic interpolation processing unit 1703. The cubic interpolation processing unit 1703 reads out converted coordinates stored in this unit and executes pixel interpolation.

FIG. 20 is a flowchart showing an example of the sequence of processing executed when the aberration correction LSI 408 according to the second embodiment corrects aberrations.

In step S1801, the aberration correction LSI 408 controls the color separation unit 802 to separate color information of a pixel. Since this processing is the same as that in step S1003 shown in FIG. 11, a description thereof will not be repeated.

In step S1802, the aberration correction LSI 408 controls the correction value acquisition units 1702 of the chromatic aberration correction units 810 to 812 to acquire aberration correction values from the aberration correction table 803 so as to calculate color misregistration amounts.

In step S1803, the aberration correction LSI 408 controls the cubic interpolation processing units 1703 of the chromatic aberration correction units 810 to 812 to acquire the coefficients of the cubic formula used in the interpolation processing at the time of coordinate conversion from the interpolation calculation coefficient storage units 1704, and to set the acquired coefficients as coefficient parameters of calculation circuits.

In step S1804, the aberration correction LSI 408 controls the cubic interpolation processing units 1703 of the chromatic aberration correction units 810 to 812 to execute interpolation calculations based on the cubic Lagrange interpolation formula to calculate coordinates after conversion. Since the contents of this processing is the same as that in FIG. 11 used to describe the first embodiment, a description thereof will not be repeated.

In step S1805, the aberration correction LSI 408 controls the cubic interpolation processing units 1703 of the chromatic aberration correction units 810 to 812 to temporarily store the coordinates after conversion calculated by the processing in step S1804 in the converted coordinate storage units 1705.

In step S1806, the aberration correction LSI 408 controls the cubic interpolation processing units 1703 of the chromatic aberration correction units 810 to 812 to acquire coefficient parameters of the cubic formula used at the time of pixel interpolation from the interpolation calculation coefficient storage units 1704, and to set them as coefficient parameters of calculation circuits. Note that the number of bits of a value that expresses a fraction below the decimal point and is required upon executing the interpolation processing of the cubic formula as fixed-point processing requires 6 bits or more when conversion errors at the time of coordinate conversion are suppressed to less than 0.1 pixels.

In step S1807, the aberration correction LSI 408 controls the cubic interpolation processing units 1703 of the chromatic aberration correction units 810 to 812 to acquire color information of reference pixels, and the coordinate information after conversion temporarily stored in the converted coordinate storage units 1705.

In step S1808, the aberration correction LSI 408 controls the cubic interpolation processing units 1703 of the chromatic aberration correction units 810 to 812 to calculate new pixel values at an interpolation position based on the acquired information of reference pixels and the acquired converted coordinates.

In step S1809, the aberration correction LSI 408 controls the color combining unit 809 to recombine color information of a new pixel based on pieces of color information of respective pixels. Since this processing is the same as that in step S1006 shown in FIG. 11, a description thereof will not be repeated.

As described above, according to the second embodiment, the interpolation processing at the time of coordinate conversion and that at the time of pixel interpolation are implemented on a single circuit. In this way, the circuit scale can be reduced. It is effective to adopt the above arrangement when a processing time has an enough margin, thus contributing to further cost and size reductions.

The examples of the representative embodiments of the present invention have been explained. However, the present invention is not limited to the aforementioned embodiments illustrated in the drawings, and modifications can be appropriately made within the scope of the present invention.

For example, the first and second embodiments do not particularly mention about the optical systems. An optical system which adopts optical members such as lenses and prisms that form a vertically or horizontally asymmetric system, or an optical system which includes a combination of a plurality of lenses or generates an image forming plane a plurality of times, may be used. In any of these optical systems, satisfactorily high conversion precision can be maintained.

The first and second embodiments have exemplified the aberration correction processing applied to the HMD which adopts the enlargement optical systems of an eyepiece. However, the present invention is not limited to this. The aberration correction processing described in the first and second embodiments may be applied to a back-projection type television and an EVF included in a camera in addition to a digital camera, a portable phone with a camera, and a digital video camera, which include optical systems and require aberration correction. Upon application to these devices, the same effects as in the aforementioned first and second embodiments can be obtained.

The present invention can be practiced by combining some or all of the components described in the first and second embodiments. Furthermore, it is easy for those who are skilled in the art to configure a new system by appropriately combining various techniques in the first and second embodiments, and such systems based on various combinations belong to the scope of the present invention.

According to the present invention, coordinate conversion errors can be reduced even by reducing the size of a table (which holds correspondence between positions before and after coordinate conversion) used in coordinate conversion of pixels upon correcting deviations of image forming positions caused by aberrations.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-263057 filed on Oct. 9, 2008, which is hereby incorporated by reference herein in its entirety.

What is claimed is:

1. An image processing system, which corrects an aberration generated in an optical system by executing coordinate conversion of pixels of an image, comprising:
   a table configured to hold correspondence between positions of pixels before and after the coordinate conversion;
   an acquisition unit configured to acquire coordinates after conversion corresponding to coordinates of representative points to be converted from the table; and
   a coordinate calculation unit configured to calculate coordinates after conversion of a pixel between the representative points acquired by the acquisition unit by an interpolation calculation using a Lagrange interpolation formula.

2. The system according to claim 1, further comprising:
a pixel interpolating unit configured to calculate a pixel value corresponding to a pixel position on a display unit by an interpolation calculation based on the coordinates calculated by the coordinate calculation unit and an original pixel value.

3. The system according to claim 2, wherein the interpolation calculation at the time of the coordinate conversion by the coordinate calculation unit and the interpolation calculation at the time of pixel interpolation by the pixel interpolating unit use a cubic interpolation formula.

4. The system according to claim 2, wherein the coordinate calculation unit and the pixel interpolating unit are implemented on a single circuit.

5. The system according to claim 3, wherein the interpolation calculation using the cubic interpolation formula by the pixel interpolating unit uses pixel values of surrounding 16 pixels of the pixel to be converted.

6. The system according to claim 3, wherein the number of bits of a value which expresses a fraction below a decimal point and is required upon executing the interpolation calculation using the cubic interpolation formula by the pixel interpolating unit as a fixed-point calculation is more than or equal to 6 bits.

7. The system according to claim 1, wherein the Lagrange interpolation formula is defined by cubic formulas given by:

$$[0 \le x \le 1] \quad y = \frac{1}{2}(x-2)(x+1)(x-1)$$
$$[1 \le x \le 2] \quad y = -\frac{1}{6}(x-3)(x-2)(x-1).$$

8. The system according to claim 7, wherein when a linear interpolation line is defined by:

$$[0 \le x \le 1] y = 1 - x$$
$$[1 \le x \le 2] y = 0$$

an area of a portion bounded by an interpolation curve of the Lagrange interpolation formula as the cubic formula and the linear interpolation line assumes a numerical value less than or equal to 0.042.

9. The system according to claim 1, wherein the coordinates after conversion calculated by the coordinate calculation unit have values on respective axes of a two-dimensional coordinate system.

10. The system according to claim 1, wherein the table holds the correspondence of positions of pixels associated with the representative points before and after the coordinate conversion.

11. The system according to claim 1, wherein the table holds coordinates after conversion for a reference color, and difference values from the reference color for other colors.

12. The system according to claim 1, wherein the aberration generated in the optical system is a deviation from an ideal image forming position caused by the aberration.

13. The system according to claim 1, wherein the optical system includes:
an optical system configured to form a captured image on an image capture element; and
an optical system configured to form a display image on a pupil position of a user in an enlarged scale.

14. An image processing apparatus, which corrects an aberration generated in an optical system by executing coordinate conversion of pixels of an image, comprising:
an acquisition unit configured to acquire coordinates after conversion corresponding to coordinates of representative points to be converted from a table which holds correspondence between positions of pixels before and after the coordinate conversion; and
a coordinate calculation unit configured to calculate coordinates after conversion of a pixel between the representative points acquired by the acquisition unit by an interpolation calculation using a Lagrange interpolation formula.

15. An aberration correction method, which corrects an aberration generated in an optical system by executing coordinate conversion of pixels of an image, comprising:
acquiring coordinates after conversion corresponding to coordinates of representative points to be converted from a table which holds correspondence between positions of pixels before and after the coordinate conversion; and
calculating coordinates after conversion of a pixel between the representative points acquired in the acquiring by an interpolation calculation using a Lagrange interpolation formula.

16. A non-transitory computer-readable storage medium storing a computer program for controlling a computer, which is incorporated in an image processing apparatus, which corrects an aberration generated in an optical system by executing coordinate conversion of pixels of an image, to function as:
an acquisition unit configured to acquire coordinates after conversion corresponding to coordinates of representative points to be converted from a table which holds correspondence between positions of pixels before and after the coordinate conversion; and
a coordinate calculation unit configured to calculate coordinates after conversion of a pixel between the representative points acquired by the acquisition unit by an interpolation calculation using a Lagrange interpolation formula.

* * * * *